United States Patent
Amato et al.

(10) Patent No.: US 11,093,793 B2
(45) Date of Patent: Aug. 17, 2021

(54) SYSTEMS AND METHODS FOR A TAILORED NEURAL NETWORK DETECTOR

(71) Applicant: Vintra, Inc., San Jose, CA (US)

(72) Inventors: Ariel Amato, Barcelona (ES); Angel Domingo Sappa, Guayaquil (EC); Carlo Gatta, Barcelona (ES); Brent Boekestein, San Jose, CA (US)

(73) Assignee: Vintra, Inc., San Jose, CA (US)

( * ) Notice: Subject to any disclaimer, the term of this patent is extended or adjusted under 35 U.S.C. 154(b) by 997 days.

(21) Appl. No.: 15/689,431

(22) Filed: Aug. 29, 2017

(65) Prior Publication Data

US 2019/0065901 A1    Feb. 28, 2019

(51) Int. Cl.
| | |
|---|---|
| G06N 3/04 | (2006.01) |
| G06K 9/62 | (2006.01) |
| G06K 9/32 | (2006.01) |
| G06N 3/08 | (2006.01) |
| G06K 9/00 | (2006.01) |

(52) U.S. Cl.
CPC ....... *G06K 9/6218* (2013.01); *G06K 9/00771* (2013.01); *G06K 9/3233* (2013.01); *G06K 9/6253* (2013.01); *G06K 9/6271* (2013.01); *G06N 3/04* (2013.01); *G06N 3/0454* (2013.01); *G06N 3/08* (2013.01); *G06N 3/0445* (2013.01); *G06N 3/0472* (2013.01)

(58) Field of Classification Search
None
See application file for complete search history.

(56) References Cited

U.S. PATENT DOCUMENTS

| | | |
|---|---|---|
| 2007/0055427 A1 | 3/2007 | Sun et al. |
| 2014/0180977 A1 | 6/2014 | Cosatto et al. |
| 2018/0089505 A1* | 3/2018 | El-Khamy ................ G06T 7/73 |
| 2018/0165809 A1* | 6/2018 | Stanitsas ............... G06T 7/0012 |

FOREIGN PATENT DOCUMENTS

| | | |
|---|---|---|
| EP | 2275971 | 1/2011 |
| WO | WO-2019046262 A1 | 3/2019 |

OTHER PUBLICATIONS

Sannen et al., "An On-Line Interactive Self-adaptive Image Classification Framework", 2008, Springer-Verlag Berlin Heidelberg, all pages (Year: 2008).*
"International Application Serial No. PCT US2018 048285, International Search Report dated Oct. 22, 2018", 2 pgs.
"International Application Serial No. PCT US2018 048285, Written Opinion dated Oct. 22, 2018", 4 pgs.
"International Application Serial No. PCT/US2018/048285, International Preliminary Report on Patentability dated Mar. 12, 2020", 6 pgs.

* cited by examiner

*Primary Examiner* — Daniel C Puentes
(74) *Attorney, Agent, or Firm* — Schwegman Lundberg & Woessner. P.A.

(57) ABSTRACT

Various embodiments described herein provide for a neural network tailored, based on user-provided input data, to detect user-specified objects in image data. An architecture of an embodiment may use unlabeled data from the user, such as a set of images from a video camera stream, while parameters of a tailored neural network (CNN) are trained or adapted.

20 Claims, 15 Drawing Sheets

SYSTEMS AND METHODS FOR A TAILORED NEURAL NETWORK DETECTOR

TECHNICAL FIELD

The present disclosure relates generally to machine learning, and, more particularly, various embodiments described herein provide for systems, methods, techniques, instruction sequences, and devices for a neural network tailored, based on user-provided input data, to detect user-specified objects, behaviors, gestures, human activities, places, or the like, depicted in image data.

BACKGROUND

Machine learning (ML) has evolved significantly to the present. Recently, with the drop in hardware cost, artificial neural networks (ANNs) have become a dominant technology in ML. Applications based on ANNs, such as deep learning, can be based on learning data representations, as opposed to task-specific algorithms.

One of the main challenges to using ANN-based architectures (e.g., convolutional neural networks (CNNs) and recurrent neural networks (RNNs)) is the architecture definition and the dataset generation, which usually require a large amount of labeled data. For example, the conventional pipeline for an ML-based object detection and classification system usually starts with the labeling of a large set of images containing objects from a category to be detected. A ML algorithm is designed and trained on the labeled images. The performance of such a system may then be evaluated with a small set of labeled images. In case the system performance is below the requirements, two traditional possibilities to addressing this performance issue. The first possibility involves a ML model (e.g., CNN) being modified in terms of its parameters (e.g., meta-parameters tuning) or its architecture (e.g., model selection), which usually requires a high degree of user expertise and time consuming work since the model needs to be re-trained for every change. The second possibility involves new data being acquired and labeled, and the ML algorithm being re-trained on the resulting larger dataset. Accordingly, either possibility requires time, if not user expertise, to reach an acceptable performance level.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
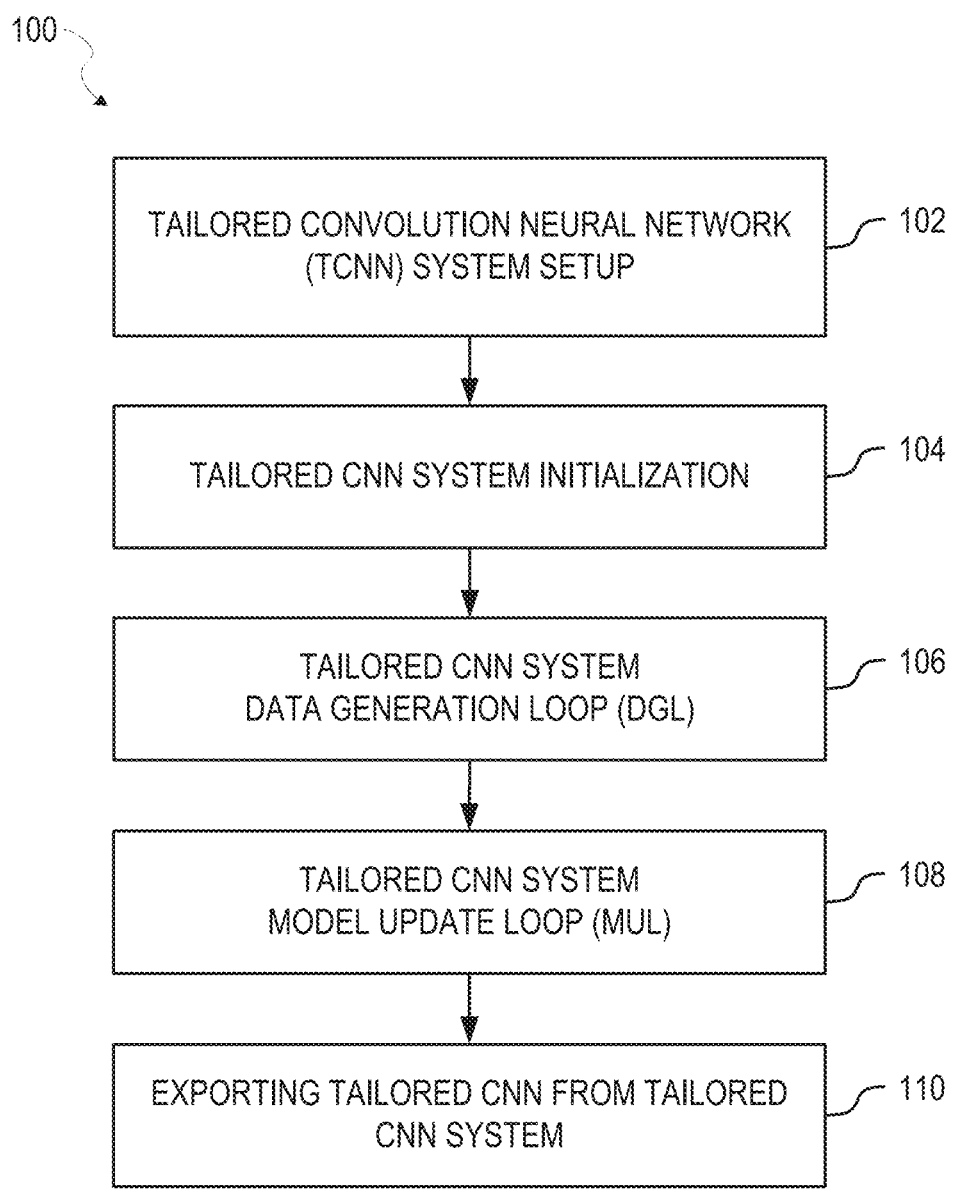
FIG. 1 is a flowchart illustrating an example method for tailoring a neural network system, according to various embodiments of the present disclosure.

Various embodiments described herein provide for a neural network tailored, based on user-provided input data, to detect user-specified objects, behaviors, gestures, human activities, places, or the like, depicted in image data. In particular, some embodiments comprise an architecture that permits a user to train a neural network for her or his specific problem without concern about dataset labeling (e.g., image labeling), neural network configuration, and neural network training. The architecture of an embodiment may permit a user to automatically deploy a convolutional neural network tailored, according to the user-provided data and the needs of the user, to detect multiple classes of objects, behaviors, gestures, human activities, places, or the like, depicted in input data. Such a convolutional neural network may be referred to hereafter as a tailored convolutional neural network (TCNN). In comparison to conventional neural networks, the TCNN of an embodiment can minimize the need for human-based labeling of data, while ensuring optimum performance of the TCNN.

An architecture of an embodiment may use unlabeled data from the user, such as a set of images from a video camera stream (e.g., a camera data feed), while parameters of a TCNN are trained or adapted. In this way, a user may create a tailored detector based on a convolutional neural network architecture, without the need to provide labeled data. Additionally, such an architecture may enable the user to create the tailored detector without knowledge of machine learning (ML), thereby permitting the user to build a tailored detector for his or her needs by just providing related raw and unlabeled data. The resulting tailored detector, implemented by the TCNN, can be configured with optimal performance to meet one or more specific needs of the user.

According to some embodiments, a TCNN is configured and trained such that the TCNN can be deployed in a device to detect specific objects, behaviors, gestures, human activities, places, or the like, in that device's environment. Additionally, the device receiving and running the TCNN may be one that lacks resources (e.g., computing or memory resources) to support or operate a comparable neural network that has been trained on a larger, and possibly more diverse, training dataset than the training dataset used to train the TCNN.

For instance, a TCNN may be deployed to a video camera being operated by a user in a physical environment where the user would like the TCNN to detect objects, behaviors, gestures, human activities, places, or the like, in the video camera's environment. According to some embodiments, such a TCNN is trained to detect objects, behaviors, gestures, human activities, places, or the like, in the video camera's stream while accounting/compensating for the video camera's location in the environment, scheduled activities, the video camera's angle of view, and environment lighting, which may vary based on the time of day or time of the year (e.g., season). For example, the operator of a video camera network on a highway system may find that lighting and environmental conditions dramatically impact the efficacy of conventional vehicle and pedestrian convolutional neural network (CNN) detectors. Using a TCNN of an embodiment, such an operator could deploy a detector that is tailored (e.g., effectively, custom-built) for the operator's environment and takes into account all the environmental changes so that vehicle and pedestrian detection precision and recall are improved over a conventional detector. This same use case may be applicable for other locations where a surveillance video camera, either fixed or mobile, is deployed.

In an example relating to an industrial environment, a camera operator may want to perform quality control checks on a part or manufacturing process using a video camera. The camera operator can avoid the traditional approach of performing several steps to build their own conventional detector and, rather, the camera operator can use a TCNN of an embodiment to take the camera operator's existing video camera feed data and use it to train a tailored detector, unique to the camera operator's industrial conditions and process.

In an example relating to an agriculture environment, there may be thousands of types of plants, vegetables, fruits, and flowers that are harvested. A grower could use a TCNN of an embodiment to set up a custom detector that alerts the grower when images of produce (e.g., taken by a camera or video camera) indicate that the produce is ripe for harvest. Such a TCNN could be trained to adjust to detect produce ripeness under different seasonal, sunlight, weather (e.g., rain), or other environmental conditions.

In an example relating to surveillance via a mobile camera device, a TCNN may be deployed to a video camera device being operated by a user in a mobile environment, such as a vehicle-mounted camera. According to some embodiments, such a TCNN is trained to detect very rare or case specific objects. For instance, an operator of a waste management company may want to have a specific detector for a vehicle mounted camera to identify when the operator's refuse bins are damaged in a specific way, such as a wheel missing or the trash with a missing lid. Based on image data collected by the vehicle-mounted camera (e.g., archived video), a TCNN of an embodiment may be prepared to function as the case-specific detector that the operator can deploy.

For each of the foregoing examples, the TCNN may be deployed to operate on, or in close proximity to (e.g., as an edge device, such as a gateway), the camera or video camera that captures raw images to be processed by the TCNN. This proximity of the TCNN to the camera or video camera may reduce the impact of network latency on how quickly objects, behaviors, gestures, human activities, places, or the like, are detected in the raw images provided by the camera or video camera.

As used herein, a "raw image" may comprise an unlabeled image. A raw image may be captured by a digital image capture device, which may provide a single image at a time (e.g., a digital still), a set of images over time (e.g., a sequence of images), or a continuous video stream. An example of the digital image capture device can include, without limitation, one included by a mobile device (e.g., a smartphone); a surveillance camera (e.g., an Internet Protocol (IP) camera); a traffic light camera (e.g., deployed at a street intersection); a body-worn camera; a camera included on a water, ground, or aerial drone; and the like.

An architecture of some embodiments comprises a heavy-trained CNN, a TCNN, and a set of expert classifiers. As used herein, a "heavy-trained CNN" refers to a CNN that is trained on a larger training dataset than the training dataset used to train a TCNN, and that can be used by various embodiments described herein to tailor (e.g., train or adapt) a TCNN to detect certain objects, behaviors, gestures, human activities, places, or the like, in raw images (e.g., according to a user's specific needs). Additionally, a heavy-trained CNN may be set for high recall performance. Both the TCNN and the heavy-trained CNN may be trained to detect multiple classes (e.g., categories) of objects, behaviors, gestures, human activities, places, or the like. As used herein, detection or labelling of an object can also include detection or labelling of a behavior, a gesture, a human activity, a place, or the like.

According to some embodiments, the heavy-trained CNN is used to detect a first set of regions of interest (ROIs) in a set of raw input images (e.g., from a database or real video sequence) and classify that first set of ROIs with a first set of region labels. As used herein, a "region of interest (ROI) pair" may comprise a region of interest (ROI) detected in a raw image and a region label that classifies the ROI detected in the raw image. Under a first setting (e.g., high precision setting), the TCNN may perform detection and classification on the same set of raw images, and generate a second set of ROIs and a second set of region labels, which can be compared with those generated by the heavy-trained CNN. From the comparison, a set of unique ROIs and corresponding region labels can be identified and double checked by the set of expert classifiers, which assigns confidence levels (e.g., ranging from 0 to 100% confidence) to the set of unique ROIs and corresponding region labels. For those unique ROIs having confidence levels that meet or exceed a predetermined confidence level threshold, the set of unique ROIs and corresponding region labels may be considered able to be used to update the TCNN. For those unique ROIs that do not have confidence levels that meet or exceed the predetermined confidence level threshold, a human data labeling system (e.g., crowdsourcing or dedicated human data labeling system) may be used to re-classify those ROIs. Under a second setting (e.g., optimal precision and recall performance setting) different from the first setting, the TCNN may again perform detection and classification on the set of raw images, and generate a third set of ROIs and a third set of region labels. This third set of ROIs and third set of region labels can be compared against the set of unique ROIs and corresponding region labels, some of which may have been re-classified by the human labeling system. This may result in a fourth set of ROIs and corresponding region labels with associated confidence levels. Based on the associated confidence levels, the fourth set of ROIs and corresponding region labels may be stored as either easy-labeled training data or hard-labeled training data. One or more of the foregoing operations may be iteratively performed as part of a data generation loop (DGL) of the TCNN system.

For some embodiments, the human labeling system is used once, on input data based on the output of the expert classifiers (for those some ROIs that do not meet or exceed the predetermined confidence level threshold). Subsequently, the "second predictions" of the TCNN are used to decide if such input data is stored in as easy-labeled or hard-labeled training data.

As used herein, a ROI may comprise a bounding box, identified within a raw image, that contains something of interest, such as an object, a behavior, a gesture, a human activity, a place, or the like, detected by an ML model, such as a neural network. For a given raw image, an ML model may identify a plurality of ROIs. Additionally, the ML model (e.g., a neural network) may detect a region label for each ROI, which may correspond to a category associated with what is detected within the ROI (e.g., an object, a behavior, a gesture, a human activity, or a place detected within the ROI).

Using the easy-labeled training data, the hard-labeled training data, or a mix of both, the TCNN system can iteratively train the TCNN as part of a model update loop (MUL) of the TCNN system. For some embodiments, a cycle of the MUL may be performed subsequently to a cycle of the DGL of the TCNN system being completed.

For some embodiments, the TCNN system performs a DGL and a MUL until the TCNN of the TCNN system is able to satisfy a performance criterion set by a user. In this way, a TCNN system of an embodiment may build and train a TCNN by iteratively performing operations on a data collection level and a model update level until the TCNN is suitable for use as specified by a user.

Though various embodiments are described herein with reference to a CNN, other embodiments may be adapted to operate with other ML models, such as a recurrent neural networks (RNN), a long short-term memory (LSTM), and a generative adversarial network (GAN).

The description that follows includes systems, methods, techniques, instruction sequences, and devices that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a flowchart illustrating an example method 100 for tailoring (e.g., training or adapting) a neural network system, according to some embodiments. For some embodiments, the method 100 is performed, at least in part, by a system such as a tailored convolutional neural network system 200 described below with respect to FIG. 2. An operation of the method 100 (or another method described herein) may be performed by a hardware processor (e.g., a central processing unit or graphics processing unit) of a computing device (e.g., a desktop, server, laptop, mobile phone, tablet, etc.), which may be part of a computing system based on a cloud architecture.

As shown, the method 100 begins with operation 102, where a tailored convolutional neural network (TCNN) system is set up. During operation 102, one or more parameters of the TCNN system are set up according to the needs of a user. According to some embodiments, a user selects or defines one or more parameters that include, without limitation, a performance parameter, a category parameter, and an input data connection parameter.

For example, the performance parameter may define an expected performance level of a detector implemented by a TCNN of the TCNN system, and the category parameter may define the number of categories (e.g., classes) of what the TCNN is expected to detect (e.g., an object, a behavior, a gesture, a human activity, or a place). In particular, the performance parameter can determine which template TCNN, from a set of template TCNNs, the TCNN is to be built from or built upon. In this way, the determined template TCNN serves as a base for the TCNN that is tailored according to the needs of a user.

According to some embodiments, a template TCNN may comprise a CNN already trained in a general framework. A template TCNN can comprise a CNN derived from, or initialized as a version of, a known detector (e.g., object, behavior, gesture, human activity, or place detector), such as a single-shot multibox detector presented by Wei Liu, Dragomir Anguelov, Dumitru Erhan, Christian Szegedy, Scott Reed, Cheng-Yang Fu, and Alexander C Berg, such as a YOLO (You only look once) object detection system by Joseph Redmon, Santosh Divvala, Ross Girshick, and Ali Farhadi. In order to achieve a desired trade-off between accuracy and speed, a template TCNN may be modified by one or more of the following actions: reducing the capacity of selected layers; removing layers; reducing the size of output maps; or reducing the input image size. As an example, reducing the input image size may drastically increase the speed of a template CNN while reducing the overall performance.

For some embodiments, a template TCNN may be trained using a training dataset that is smaller than a dataset used to train a heavy-trained CNN. For instance, a template TCNN may be trained using 5-10% of the dataset used to train a heavy-trained CNN. Additionally, for some embodiments, a template TCNN is initialized by training the template TCNN on all, or almost all, the same categories as those used to train a heavy-trained CNN. In this way, various embodiments can ensure that the template TCNN can detect generic low-level features while requiring much less training time than the heavy-trained CNN.

The following Table 1 provides an example listing of six template TCNNs that, according to some embodiments, may serve as options for starting a new TCNN.

TABLE 1

| Numbers of categories to detect | Average performance | Example Speed Achieved During Testing (in frames per second - FPS) |
| --- | --- | --- |
| 1-10 | low | 120 FPS |
| 1-10 | medium | 100 FPS |
| 1-10 | high | 80 FPS |
| 1-30 | low | 80 FPS |
| 1-30 | medium | 60 FPS |
| 1-30 | High | 30 FPS |

As shown in Table 1, each of the six template TCNNs is designed with a different combination of characteristics with respect to the number of categories (e.g., classes of objects, behaviors, gestures, human activities, or places) it can detect, average performance, and number of frames (e.g., raw images) a second that could be processed at test time. Based on a user's selection of a performance parameter (e.g., low, medium, or high) and a user's selection of a category parameter (e.g., the number of different categories to be detected), a TCNN system of an embodiment may select one of the six template TCNNs listed in Table 1 as the initial TCNN to be built upon for a user's need(s). The reference speed calculated for a particular template TCNN in Table 1 may be determined based on operation of the particular template TCNN on specific computing hardware, such as a GeForce® Titan X GPU.

According to some embodiments, the category parameter may comprise a set of specific categories, selected by a user, that the TCNN is expected to detect. The set of specific categories is selected from a list of categories supported by the TCNN system (e.g., cars, trucks, aircraft, men, women, bicycles, vehicle passengers, vehicle drivers, animals, behaviors, gestures, human activities, places, etc.) and available for the user to select.

With regard to the input data connection parameter, a user can specify a connection to a data source containing a set of raw images (e.g., from a video stream) provided by the user to the TCNN system, which the TCNN system will use to tailor (e.g., train or adapt) the TCNN of the TCNN system. The dataset of raw images may be similar to ones the user will be using the TCNN to process once the TCNN has been deployed (e.g., used in a real scenario). For instance, the set of raw images may be provided via a user's network video camera (e.g., Internet Protocol (IP) camera), or may comprise archived videos to which a user has access. The set of raw images may represent the minimum amount of data used to tailor a template TCNN (e.g., selected based on user-selected performance and category parameters) to become the TCNN of the TCNN system.

The method 100 continues with operation 104, where the TCNN system is initialized. Based on the one or more parameters selected by the user and the set of raw images provided by the user, during operation 104 the TCNN system may configure one or more components of the TCNN system, which can include a TCNN, a heavy-trained CNN, a set of expert classifiers, a human labeling system, and a training datastore. For instance, during operation 104, a template TCNN is selected to be the TCNN based on the performance parameter and the category parameter provided by the user. Likewise, where there is a plurality of heavy-trained CNNs available for use by the TCNN system, the category parameter may determine which heavy-trained CNN is used by the TCNN system. During operation 104, a human labeling system may be selected, from a plurality of human labeling systems that are available for use by the TCNN system, based on the one or more parameters selected by the user. During operation 104, the set of expert classifiers may be set up to at least classifiers that correspond to user-selected categories as specified by the category parameter (e.g., a classifier for classifying an object as a vehicle, and another classifier for classifying an object as not a vehicle). During operation 104, an easy-labeled training datastore and a hard-labeled training datastore may be initialized to receive and store respectively easy-labeled and hard-labeled training data generated in accordance with various embodiments. Additionally, during operation 104, the easy-labeled training datastore may be initialized by storing 5-10% of the training dataset used to train the heavy-trained CNN of the TCNN system. The hard-labeled training datastore may initially be left empty by operation 104.

For various embodiments, the easy-labeled training datastore is used to store (e.g., for TCNN training purposes) easy-labeled training data, while the hard-labeled training datastore is used to store hard-labeled training data. As used herein, "easy-labeled training data" may comprise labeled image data that was labeled by a TCNN with a confidence level that meets or surpasses a first predetermined confidence level threshold, and "hard-labeled training data" may comprise labeled image data that was labeled by a TCNN with a confidence level that did not meet or surpass the (same) first predetermined confidence level threshold. Easy-labeled training data may represent image data that was easy for the TCNN to label, while the hard-labeled training data may represent image data that was hard for the TCNN to label.

The method 100 continues with operation 106, where a data generation loop (DGL) of the TCNN system is performed. According to some embodiments, during the DGL, the TCNN system generates, from raw image data provided by the user (e.g., from a video camera deployed in a real scenario), custom-labeled data based on the need(s) of the TCNN, which may be defined by one or more parameters provided by the user during operation 102. The DGL may comprise an iterative process that is repeated until the performance level of the TCNN meets or exceeds a user-provided parameter (e.g., a performance parameter provided by the user during operation 102).

Figure 2:
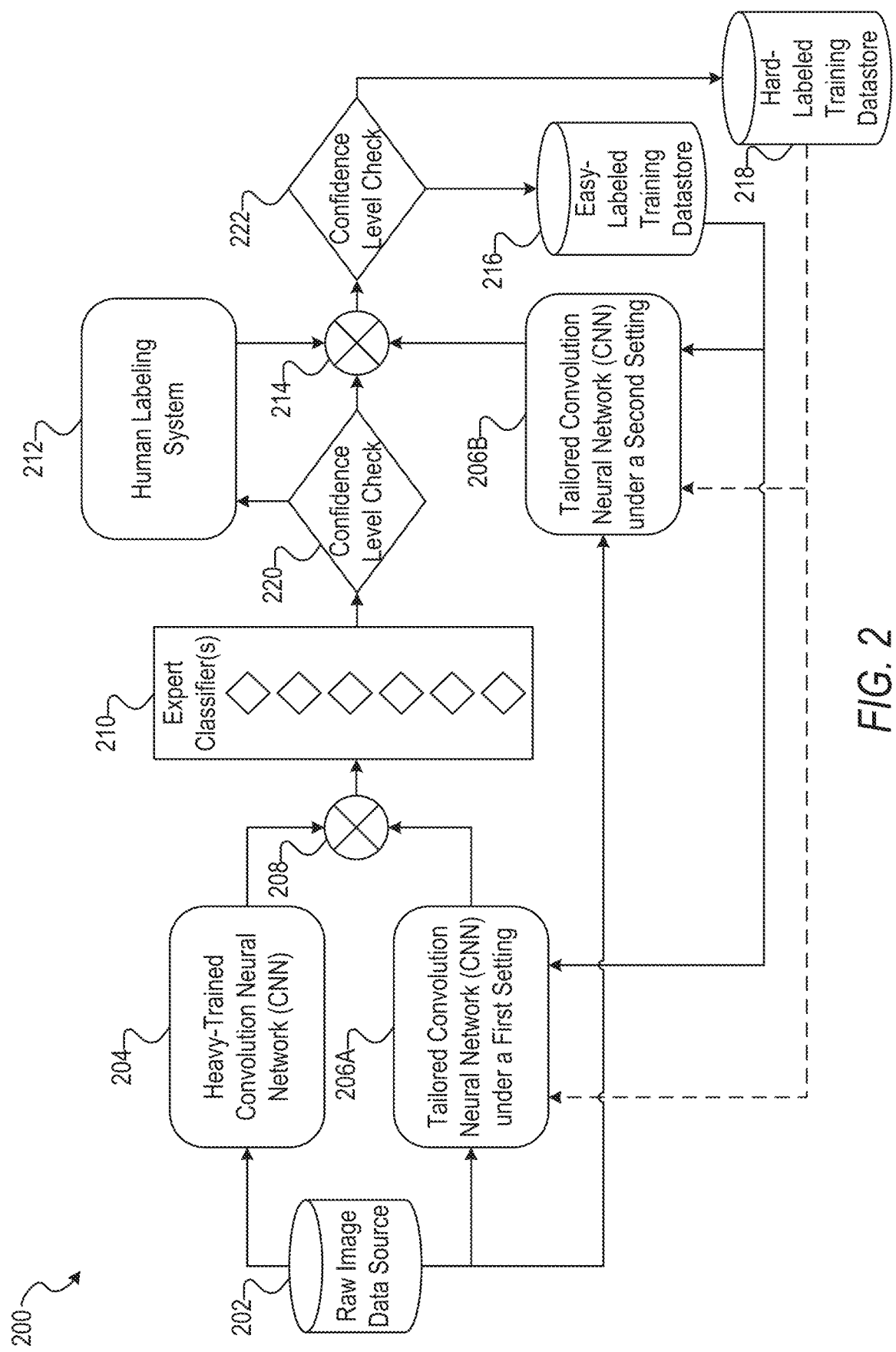
FIG. 2 is a block diagram illustrating an example tailored convolutional neural network (TCNN) system, according to various embodiments of the present disclosure.

More regarding a DGL of a TCNN system is discussed herein with respect to FIGS. 2-3.

The method 100 continues with operation 108, where a model update loop (MUL) of the TCNN system is performed. For some embodiments, during the MUL, the TCNN system updates the TCNN by training it with a training dataset at least comprising some easy-labeled training data, some hard-labeled training data, or some combination thereof. During the MUL, the TCNN system may select between easy-labeled training data and hard-labeled training data in order to optimize the learning rate of the TCNN of the TCNN system. For various embodiments, the TCNN system selects between easy-labeled training data and hard-labeled training data such that the TCNN is forced to train (e.g., learn) faster over the hard-labeled training data while preserving past memory of the TCNN by using the easy-labeled training data. The MUL may comprise an iterative process that is repeated until the performance of the TCNN meets or exceeds a user-provided parameter (e.g., a performance parameter provided by the user during operation 102).

As noted herein, at operation 102, the easy-labeled training datastore may be initialized with 5-10% of the training data used to train the heavy-trained CNN, and the hard-labeled training datastore may be initialized to be empty. Accordingly, at the first cycle of the MUL, the TCNN may be trained using the easy-labeled training datastore and the hard-labeled training datastore as initialized by operation 102. After a first cycle of a DGL of the TCNN system, training data in the hard-labeled training datastore may increase by a certain number of labeled image samples. At this point, during a subsequent cycle of the MUL, the TCNN may be retrained using some combination (e.g., union) of data from the easy-labeled training datastore and the hard-labeled training datastore. To avoid the TCNN forgetting the previously learned parameters, the TCNN system may start the training of the TCNN with the parameters as learned by the previous loop (or as initialized by the template TCNN) and, further, may employ one of the following schemes: (a) using a small learning rate for the lower layers of the TCNN and progressively increasing the learning rate while moving to higher layers of the TCNN; (b) retaining the lower-layer parameters of the TCNN and focusing on fine-tuning the upper layers of the TCNN; or (c) employing a neural network training method that is known to avoid catastrophic forgetting.

According to some embodiments, continued training of a TCNN during a MUL of a TCNN system may correspond to instances where the TCNN has yet to reach a performance level defined by a user. During this continued training, the TCNN may not be operating at the full image sampling rate but, rather, may be operating in a sub-sampling mode. In case a high error rate is detected, this may permit the TCNN system to increase the image sampling (e.g., of a stream from a video camera) to increase the number of collected raw images to be used by the TCNN system.

Additionally, for some embodiments, the TCNN system is set to regularly update and maintain the TCNN so that the TCNN learns on new image data captured by a raw image data source (e.g., video camera), or new data stored to an archive. For instance, the TCNN system may be scheduled to update and maintain the TCNN, such as on a weekly or monthly basis. In another instance, the TCNN system may be configured to update and maintain the TCNN when a particular amount of new image data has been collected (e.g., received or archived) from a raw image data source.

More regarding a MUL of a TCNN system is discussed herein with respect to FIGS. 2-3.

The method 100 continues with operation 110, where the TCNN of the TCNN system, as created and trained by operations 102-108, is exported from the TCNN system. In particular, at operation 110, the TCNN may be exported to a known ML framework format, such as TENSORFLOW®, Caffe, Torch, and the like.

FIG. 2 is a block diagram illustrating an example tailored convolutional neural network (TCNN) system 200, according to some embodiments. As shown, the TCNN system 200 comprises a raw image data source 202, a heavy-trained convolutional neural network (CNN) 204, a tailored convolutional neural network (TCNN) 206A operating under a first setting, a tailored convolutional neural network (TCNN) 206B operating under a second setting, a set of expert classifiers 210, a human labeling system 212, an easy-labeled training datastore 216, and a hard-labeled training datastore 218. For some embodiments, the easy-labeled training datastore 216 and the hard-labeled training datastore 218 are implemented on a single data storage device or using a single database. For various embodiments, the components and arrangement of components may vary from what is illustrated in FIG. 2.

The heavy-trained CNN 204 may comprise a heavy neural network that has been trained with a large training dataset (e.g., comprising labeled images), and that may be continuously improved (e.g., retrained) over time (e.g., when not being used by the TCNN system 200). The heavy-trained CNN 204 may be a CNN capable of detecting many (e.g., several thousand) different categories (e.g., of objects, behaviors, gestures, human activities, or places) in a raw image. Accordingly, for a raw image processed by the heavy-trained CNN 204, the heavy-trained CNN 204 can detect a set of regions of interest (ROIs) in the raw image and provide labels for each of those ROIs that correspond to categories the heavy-trained CNN 204 is trained to recognize.

As a result of its training using a large training dataset, the heavy-trained CNN 204 may have an architectural size or complexity that causes the heavy-trained CNN 204 to perform more slowly and require significantly more computing resources than does the TCNN 206. Additionally, the architectural size or complexity of the heavy-trained CNN 204 may be such that the heavy-trained CNN 204 is prevented from being deployed and operated on real-world devices, such as a desktop computer processing surveillance video data or a video camera deployed in a physical environment, which may have limited computing resources (e.g., processor or memory resources). Accordingly, the heavy-trained CNN 204 may not be feasible for real-world applications. Additionally, for the purposes of operating the TCNN system 200, at least the heavy-trained CNN 204 of the TCNN system 200 may be operated on one or more devices having sufficient computing resources to process raw image data at a reasonable rate during a DGL, a MUL, or both of the TCNN system 200. For instance, the heavy-trained CNN 204 may operate (e.g., be hosted) on a cloud-based graphic processing unit (GPU) server. The other components of the TCNN system 200 may concurrently operate on at least some of the same devices as the heavy-trained CNN 204.

Each of the TCNN 206A and the TCNN 206B represents the same TCNN that is being tailored (e.g., generated and trained) by the TCNN system 200 for use by a user. For some embodiments, the TCNN 206A under the first setting represents the TCNN when it is being operating under a first precision (e.g., high precision setting), while the TCNN 206B represents the same TCNN when it is being operated under a second precision (e.g., an optimal precision and recall performance setting) that is lower than the first precision. For some embodiments, the TCNN 206A and the TCNN 206B share a copy of the TCNN, but operate the shared TCNN non-concurrently, under their respective settings (e.g., prediction settings), when processing a raw image within the TCNN system 200. Alternatively, for some embodiments, each of the TCNN 206A and the TCNN 206B comprises its own copy of the TCNN. In some such embodiments, each of the copies of the TCNN may be updated (e.g., replaced with an updated version of the TCNN) at the end of a cycle of the MUL associated with the TCNN system 200, thereby ensuring that the TCNN 206A and the TCNN 206B are effectively using the same TCNN. As noted herein, when the TCNN system 200 is initially set up and initialized, the TCNN represented by each of the TCNN 206A and the TCNN 206B may comprise a template TCNN, which may have been selected from a plurality of template TCNNs based on one or more parameters provided by a user (e.g., performance and category parameters).

The set of expert classifiers 210 (hereafter, expert classifiers 210) may comprise one or more classifiers trained on a large training dataset (e.g., labeled images). For a ROI and corresponding region label detected by the heavy-trained CNN 204, the TCNN 206A, or both, a classifier of the expert classifiers 210 may be designed to decide whether the ROI belongs or does not belong to a category indicated by the region label. Some or all of the large training dataset used to train the expert classifiers 210 may be similar to the training dataset used to train the heavy-trained CNN 204. Additionally, the expert classifiers 210 may be continuously improved (e.g., retrained) over time (e.g., when not being used by the TCNN system 200).

According to some embodiments, the role of the expert classifiers 210 is to validate region labels detected by the heavy-trained CNN 204 and the TCNN 206A in association with ROIs detected in a particular raw image. Additionally, for each region label-ROI pairing validated by the expert classifiers 210, the expert classifiers 210 may provide a confidence level for the pairing. As described in further detail herein, this can permit the expert classifiers 210 to provide increased confidence in the predictions provided by the TCNN 206A.

The human labeling system 212 may represent a system that uses, or facilitates, a human individual confirming or modifying a region label in association with a ROI. For instance, the human labeling system 212 may comprise a crowdsourcing platform that connects human labor (e.g., a human individual) with a ROI and an associated region label to confirm whether the association between the ROI and the associated region label is accurate. In another instance, the human labeling system 212 may comprise a system that permits a dedicated staff (e.g., provided by a third party) to confirm or modify the region label associated with a ROI.

During operation of the TCNN system 200, a set of raw images (representing unlabeled image data) from the raw image data source 202 may be processed by the heavy-trained CNN 204, processed by the TCNN 206A, and processed by the TCNN 206B. The raw image data source 202 may represent a digital image capture device or a datastore storing the set of raw images captured by a digital image capture device (e.g., one deployed in a real-world environment, such as an airport or a bank). With respect to a video stream (e.g., captured by a video camera), the video stream may be sampled at a particular rate (e.g., 10-120 frames per second but potentially lower as well) to extract the set of raw images, each of which will then be processed by the heavy-trained CNN 204, processed by the TCNN 206A, and processed by the TCNN 206B. For a particular raw image processed by the heavy-trained CNN 204, the output of the heavy-trained CNN 204 may comprise a set of ROI pairs detected in the raw image by the heavy-trained CNN 204, where each ROI pair comprises a ROI detected in the particular raw image and a region label (e.g., object category) detected for the ROI and that classifies the ROI. The same particular raw image may be processed by the TCNN 206A, and the output of the TCNN 206A may comprise a set of ROI pairs detected in the raw image by the TCNN 206A. Likewise, the same particular raw image may be processed by the TCNN 206B, and the output of the TCNN 206B may comprise a set of ROI pairs detected in the raw image by the TCNN 206B. While the outputs of the heavy-trained CNN 204 and the TCNN 206A may be used at operation 208, the output of the TCNN 206B may be later used at operation 214. Each of operation 208 and operation 214 may represent a process for comparing and clustering (e.g., matching) different sets of ROI pairs. Additionally, as noted herein, the output of the TCNN 206A may be produced by the TCNN 206A while the TCNN is set for a first precision setting (e.g., high precision setting), and the output of the TCNN 206B may be produced by the TCNN 206B while the TCNN is set for a second precision (e.g., optimal precision and recall performance) lower than the first precision.

At operation 208, the outputs of the heavy-trained CNN 204 and the TCNN 206A may be compared and clustered (e.g., matched) to produce a set of unique ROI pairs. For instance, the outputs of the heavy-trained CNN 204 and the TCNN 206A may be compared and clustered based on one or more of the following with respect to a particular raw image: a size of a region of interest; a position of the region of interest within the raw image; and a region label associated with the region of interest. Those ROI pairs detected by the heavy-trained CNN 204 and the TCNN 206A that do not match (e.g., non-overlapping regions of interest) may be included in the set of unique ROI pairs produced at operation 208.

The set of unique ROI pairs produced at operation 208 may be subsequently evaluated by the expert classifiers 210. As output, the expert classifiers 210 may produce a set of confidence levels that correspond to the set of unique ROI pairs. In particular, for each unique ROI pair in the set of unique ROI pairs, the ROI of the unique ROI pair may be evaluated by a classifier, in the expert classifiers 210, associated with the region label (e.g., object category, such as "car" or "not car") of the unique ROI pair. The confidence level output by the classifier may represent the classifier's level of confidence that the ROI contains an object that matches the region label (e.g., object category, such as "car" or "not car").

At operation 220, based on the set of confidence levels produced by the expert classifiers 210, those ROI pairs in the set of unique ROI pairs having a confidence level that does not meet or exceed a first predetermined confidence level threshold (e.g., 79% confidence) may be routed to the human labeling system 212. For each ROI pair routed to the human labeling system 212, a human individual may confirm whether the region label of the ROI pair matches the ROI of the ROI pair or, alternatively, may modify the region label of the ROI pair. As a result, the human labeling system 212 may produce a set of human-confirmed ROT pairs, which may be compared and clustered (e.g., matched) with the set of ROI pairs produced by the TCNN 206B at operation 214. In particular, the set of human-confirmed ROI pairs and the set of ROI pairs produced by the TCNN 206B may be compared and clustered based on one or more of the following with respect to a particular raw image: a size of a region of interest; a position of the region of interest within the raw image; and a region label associated with the region of interest.

Alternatively, based on the set of confidence levels produced by the expert classifiers 210, at operation 220 those ROI pairs in the set of unique ROI pairs having a confidence level that meets or exceeds the first predetermined confidence level threshold (e.g., 79% confidence) may be compared and clustered (e.g., matched) with the set of ROI pairs produced by the TCNN 206B at operation 214. In particular, the set of ROI pairs produced by the expert classifiers 210 and the set of ROI pairs produced by the TCNN 206B may be compared and clustered based on one or more of the following with respect to a particular raw image: a size of a region of interest; a position of the region of interest within the raw image; and a region label associated with the region of interest.

Based on the comparing and clustering, the operation 214 may produce a second set of unique ROI pairs such that those ROI pairs in the second set of unique ROI pairs matching the set of ROI pairs produced by the TCNN 206B are assigned the corresponding confidence levels provided with the set of ROI pairs produced by the TCNN 206B. Those ROI pairs in the second set of unique ROI pairs not matching the set of ROI pairs produced by the TCNN 206B may be assigned a confidence level that represents no confidence (e.g., a value of 0% confidence). Accordingly, the output of operation 214 may comprise the second set of unique ROI pairs and confidence levels assigned to the unique ROI pairs by operation 214.

At operation 222, the second set of unique ROI pairs may be evaluated based on the confidence levels assigned by operation 214. In particular, based on the set of confidence levels assigned by operation 214, those ROI pairs in the second set of unique ROI pairs having a confidence level that meets or exceeds a second predetermined confidence level threshold (e.g., 79% confidence) may be stored on the easy-labeled training datastore 216 as training data for training the TCNN 206A and the TCNN 206B. Alternatively, based on the set of confidence levels assigned by operation 214, those ROI pairs in the second set of unique ROI pairs having a confidence level that does not meet or exceed the predetermined second reference confidence level threshold (e.g., 79% confidence) may be stored on the hard-labeled training datastore 218 as training data for training the TCNN 206A and the TCNN 206B. For some embodiments, a ROI pair having a confidence level that meets or exceeds the second predetermined confidence level threshold indicates that the object category corresponding to the region label of the ROT pair is one that the TCNN 206A and the TCNN 206B can already readily detect.

When training the TCNN 206A and the TCNN 206B, the TCNN system 200 can select between using training data from the easy-labeled training datastore 216 and using training data from the hard-labeled training datastore 218. As noted herein, during training, the TCNN system 200 may cause the TCNN 206A and the TCNN 206B to train (e.g., learn) faster over and focus on the hard-labeled training data from the hard-labeled training datastore 218, while preserving past memory of the TCNN 206A and the TCNN 206B by using the easy-labeled training data from the easy-labeled training datastore 216.

As stored on the easy-labeled training datastore 216 and the hard-labeled training datastore 218, a ROI pair may comprise a copy of the raw image associated with the ROI pair, a location of the ROT of the ROI pair, and a region label of the ROI pair. The data format of the stored ROI pair may comprise an Extended Markup Language (XML) or a JavaScript Object Notation (JSON) data format.

For some embodiments, a data generation loop (DGL) of the TCNN system 200 comprises dataflow from the raw image data source 202, to the heavy-trained CNN 204, to the TCNN 206A, to operation 208, to the expert classifiers 210, to operation 220, to the human labeling system 212, to operation 214, to the TCNN 206B, to operation 222, to the easy-labeled training datastore 216, and to the hard-labeled training datastore 218. For various embodiments, a model update loop (MUL) of the TCNN system 200 comprises dataflow from the easy-labeled training datastore 216 and from the hard-labeled training datastore 218 to the TCNN 206A and to the TCNN 206B.

FIGS. 3A-3F are flow diagrams illustrating operation of an example TCNN system on a raw image 306, according to some embodiments. For some embodiments, the TCNN system of FIGS. 3A-3F is similar to the TCNN system 200 described above with respect to FIG. 2.

Figure 3A:
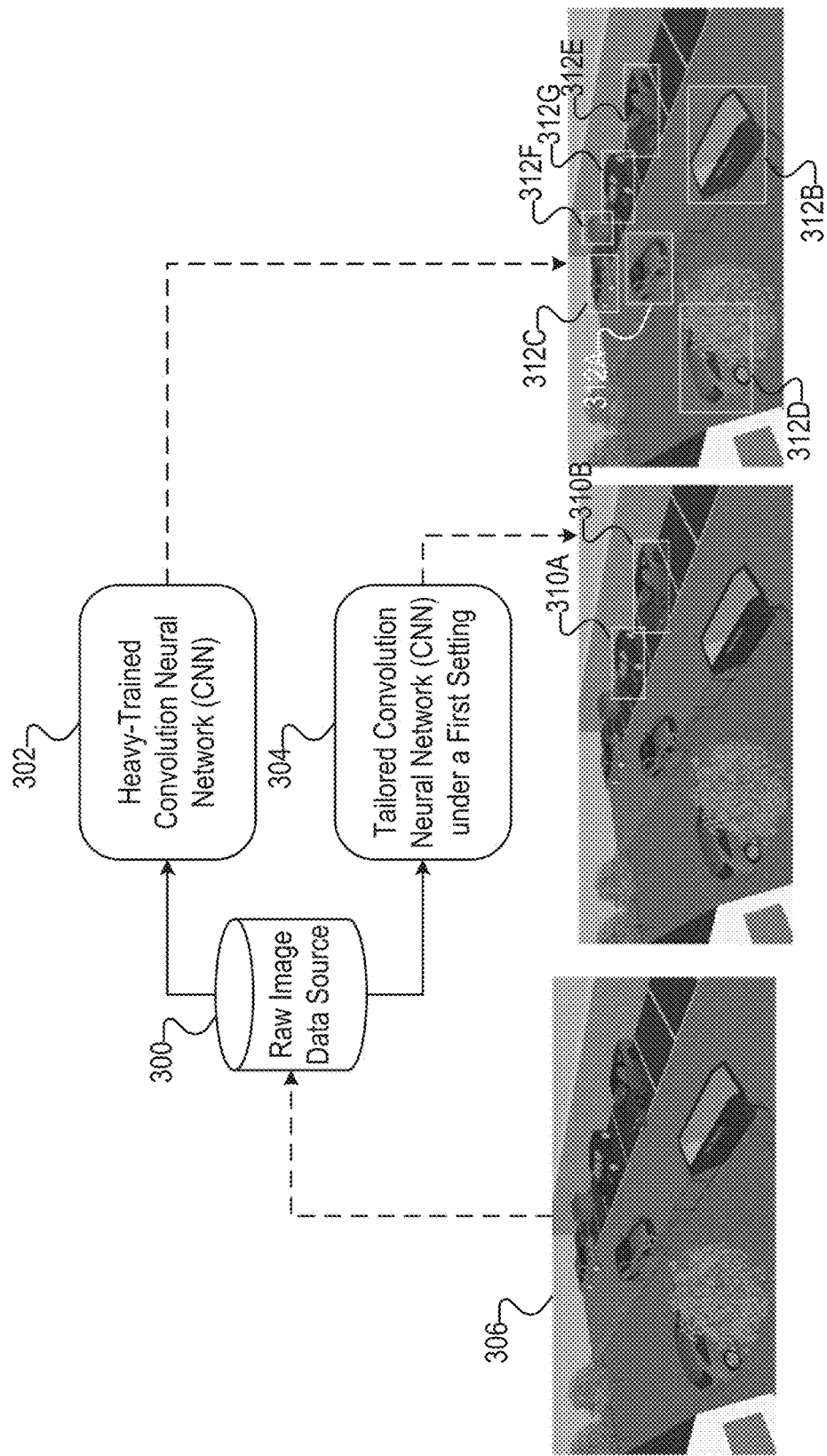
FIGS. 3A-3F are flow diagrams illustrating operation of an example TCNN system on a raw image, according to various embodiments of the present disclosure.

Referring now to FIG. 3A, a raw image data source 300 receives (e.g., captures) a raw image 306. A heavy-trained convolutional neural network (CNN) 302, and a tailored convolutional neural network (TCNN) 304 operating under a first setting (e.g., a high precision setting), receive the raw image 306 for processing from the raw image data source 300. As output, the heavy-trained CNN 302 provides regions of interest (ROIs) 312A, 312B, 312C, 312D, 312E, 312F, and 312G (hereafter, collectively referred to as ROIs 312) as bounding boxes positioned within the raw image 306, and the TCNN 304 provides ROIs 310A and 310B (hereafter, collectively referred to as ROIs 310) within the raw image 306. Though not shown, each of the ROIs 310 and each of the ROIs 312 may include a corresponding region label, which in the context of FIG. 3A may comprise an object category of a "car" or a "vehicle."

Figure 3B:
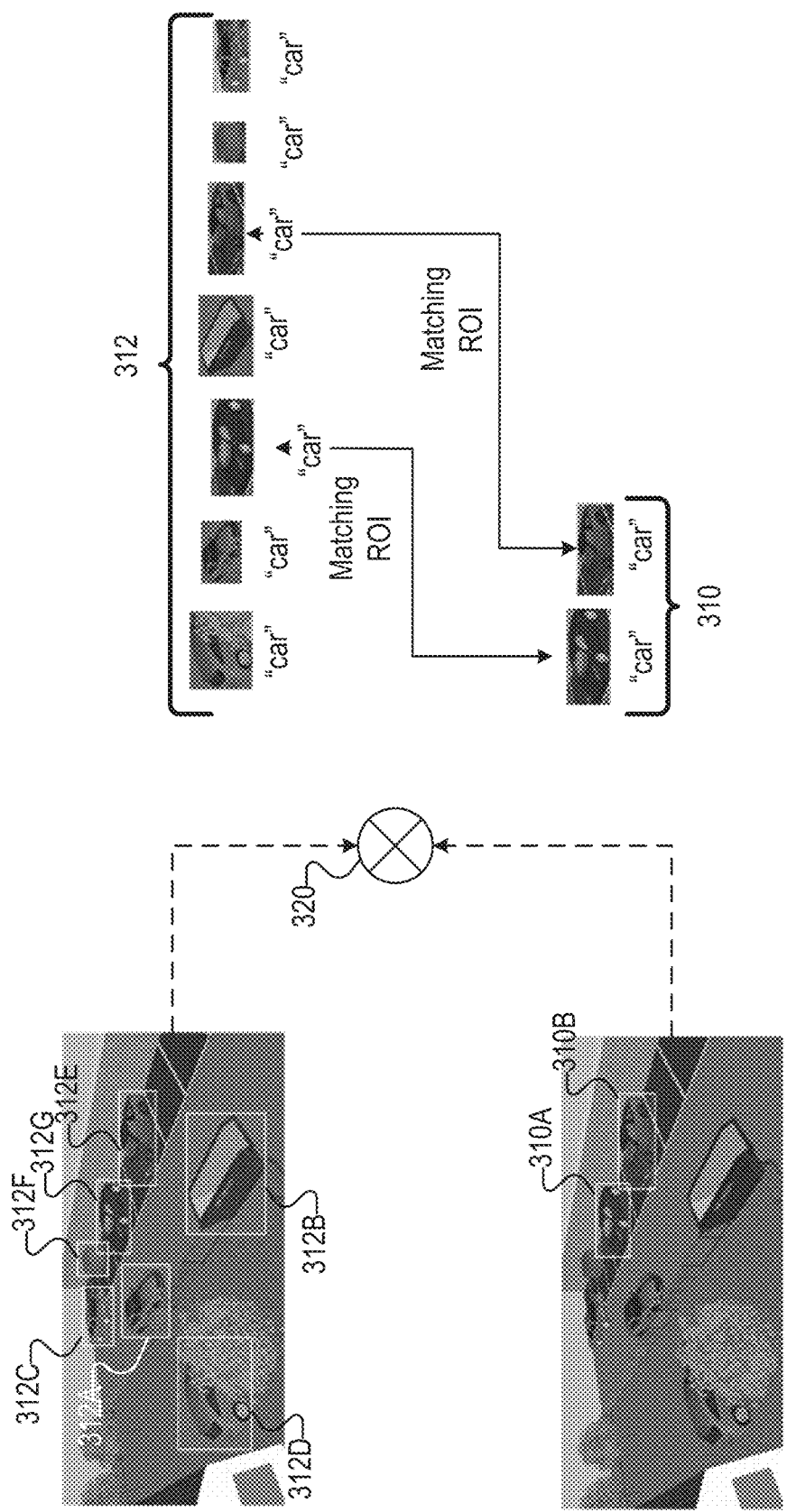
Figure 3C:
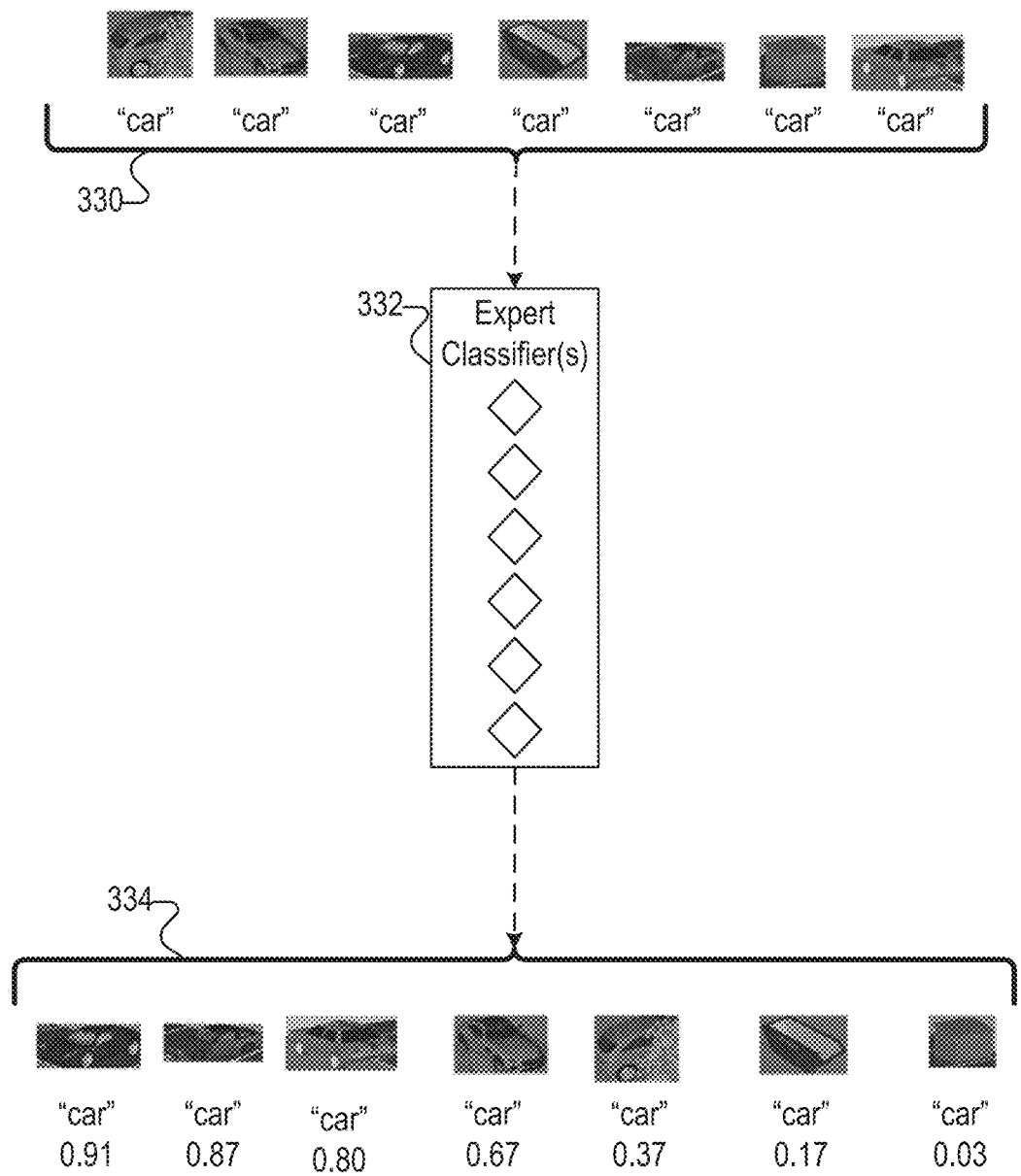

Referring now to FIG. 3B, the ROIs 310 and the ROIs 312 are compared (e.g., based on ROI position, ROI size, and associated region label) and clustered (e.g., matched) at operation 320. Referring now to FIG. 3C, the output from operation 320 results in a set of unique ROIs 330 based on the ROIs 310 and the ROIs 312. In particular, the set of unique ROIs 330 includes one instance of each ROI that matches between the ROIs 310 and the ROIs 312, and one instance of each ROI that does not match (e.g., is only included in the ROIs 310 or the ROIs 312). A set of expert classifiers 332 processes the set of unique ROIs 330 to output a set of ROIs 334 and corresponding confidence levels determined by the set of expert classifiers 332.

Figure 3D:
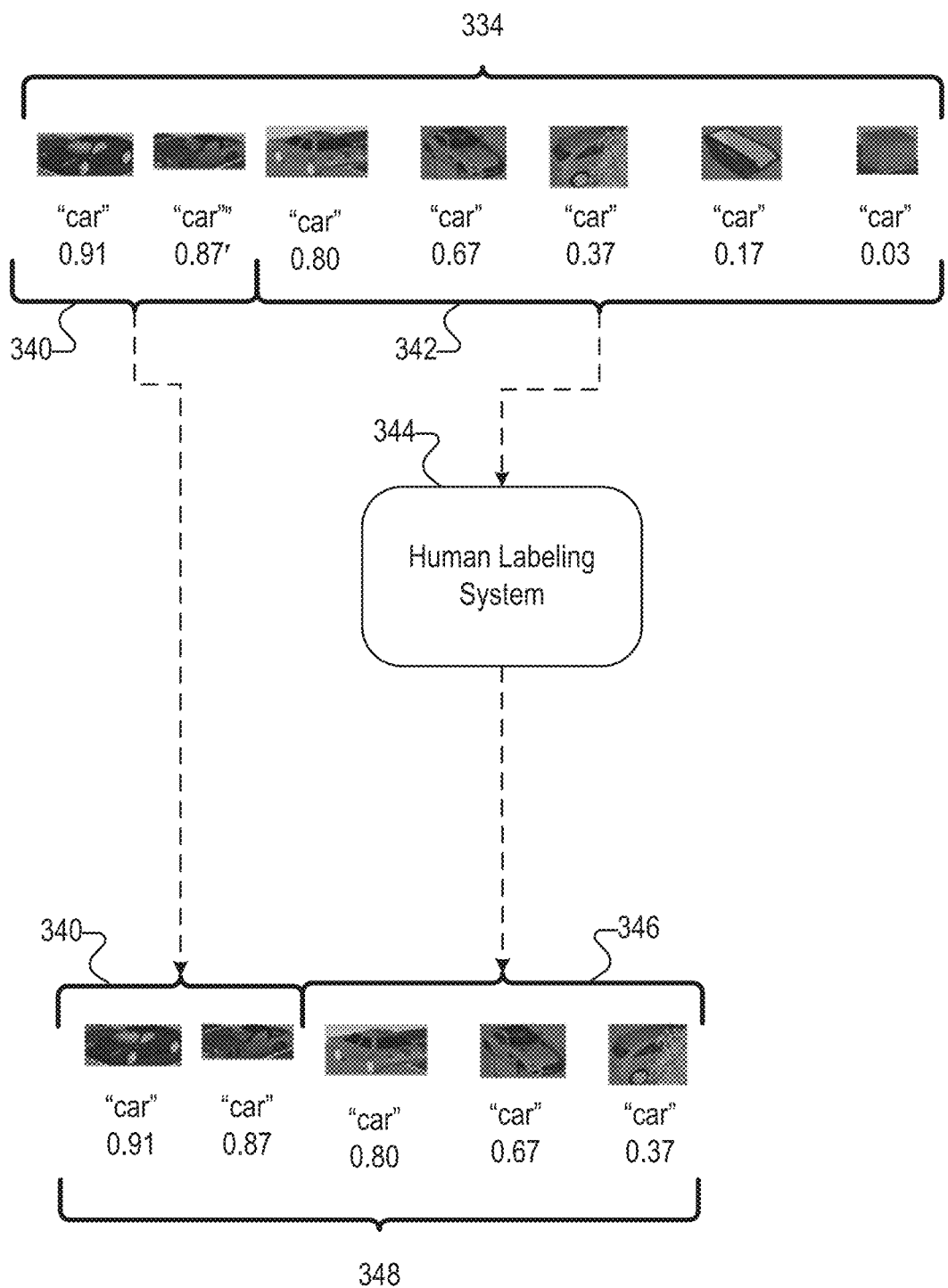

Referring now to FIG. 3D, based on their corresponding confidence levels, ROIs 342 in the set of ROIs 334 having a confidence level that does not meet or exceed a first predetermined confidence level threshold (e.g., 81%) are routed to a human labeling system 344 (e.g., for region label confirmation or modification by a human individual), while ROIs 340 in the set of ROIs 334 having a confidence level that meets or exceeds the predetermined confidence level threshold are used as-is in a subsequent operation of the TCNN system. A set of human-confirmed ROIs 346 from the human labeling system 344 are combined with the ROIs 340 to form a set of ROIs 348 with corresponding confidence levels. As shown, the set of human-confirmed ROIs 346 have a confidence level of one (1.0) as a result of those ROIs being confirmed by a trusted source (i.e., one or more human individuals).

Figure 3E:
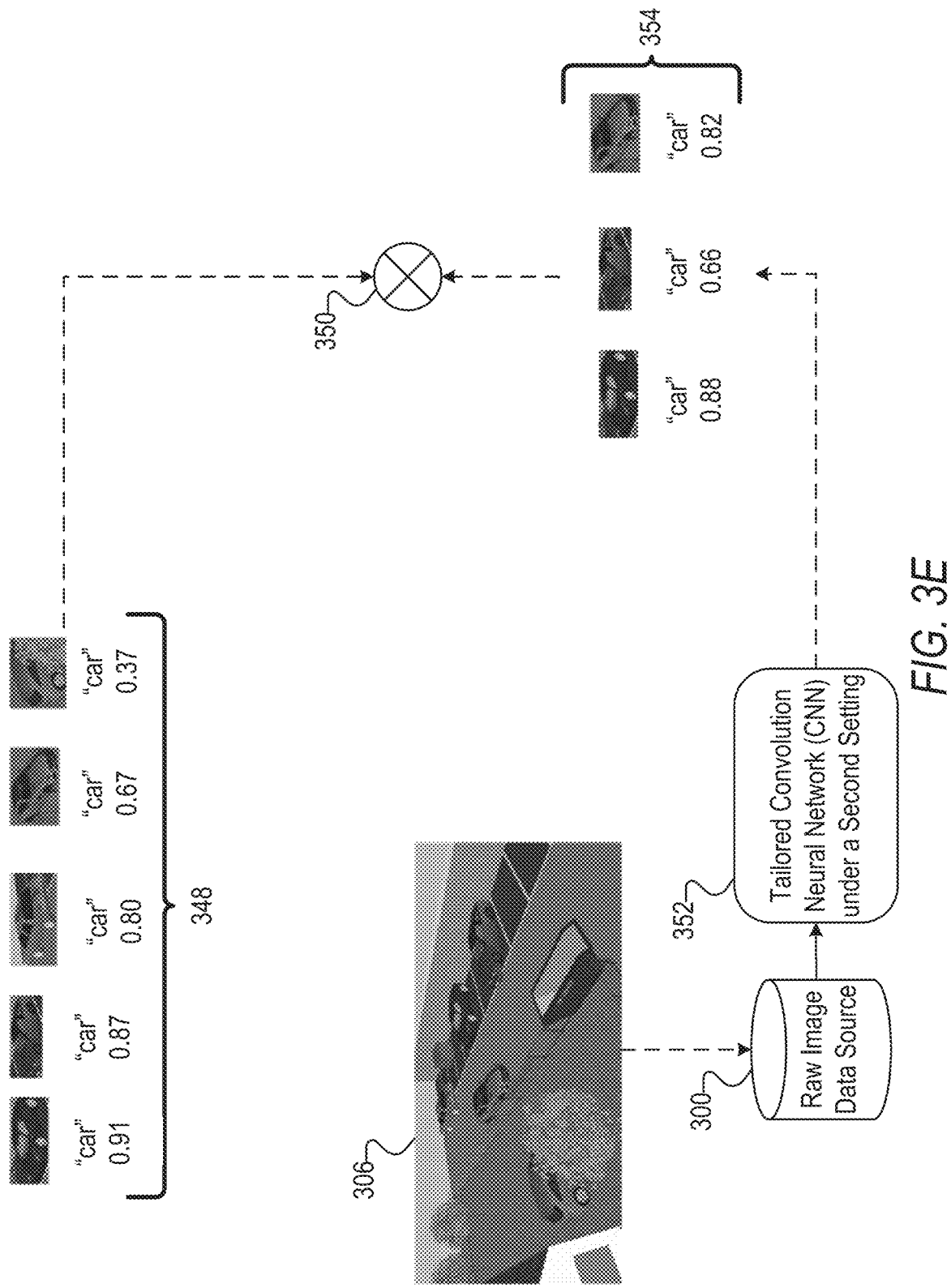
Figure 3F:
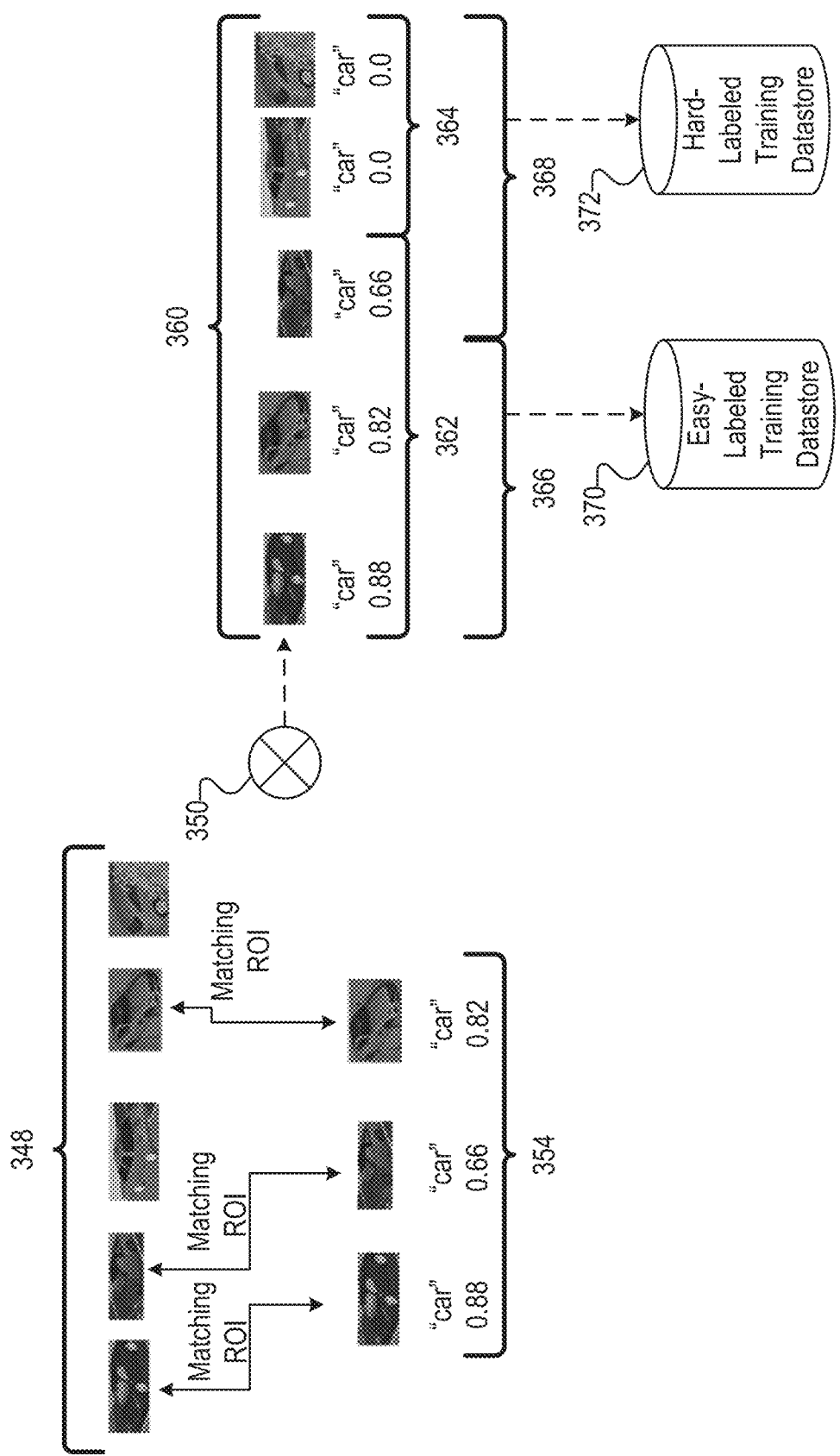

Referring now to FIG. 3E, a tailored convolutional neural network (TCNN) 352 operating under a second setting (e.g., optimal precision and recall performance setting) receives the raw image 306 for processing from the raw image data source 300. As output, the TCNN 352 provides a set of ROIs 354 with corresponding confidence levels. At operation 350, the set of ROIs 348 and the set of ROIs 354 are compared (e.g., based on ROI position, ROI size, and associated region label) and clustered (e.g., matched), as shown in FIG. 3F. Referring now to FIG. 3F, operation 350 outputs a set of ROIs 360. ROIs 362 of the set of ROIs 360 represent those ROIs that matched between the set of ROIs 348 and the set of ROIs 354 and, as such, are assigned the corresponding confidence levels from the set of ROIs 354. ROIs 364 of the set of ROIs 360 represent those ROIs that did not match between the set of ROIs 348 and the set of ROIs 354 and, as such, are assigned a confidence level of zero (0). ROIs 366 from the set of ROIs 360 are stored to an easy-labeled training datastore 370 based on a second predetermined confidence level threshold (e.g., 81%), while ROIs 368 from the set of ROIs 360 are stored to a hard-labeled training datastore 372 based on the second predetermined confidence level threshold.

Figure 4:
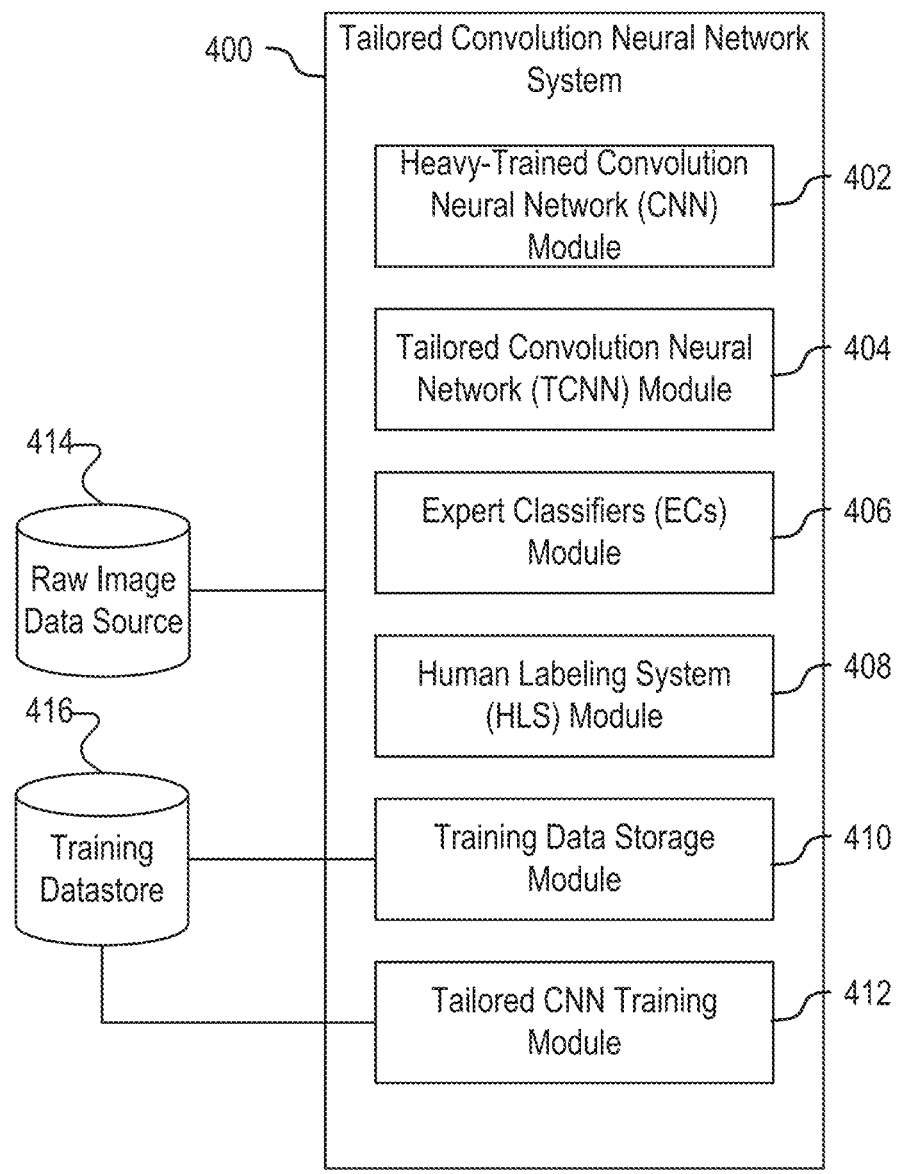
FIG. 4 is a block diagram illustrating an example TCNN system, according to various embodiments of the present disclosure.

FIG. 4 is a block diagram illustrating an example TCNN system 400, according to some embodiments. As shown, the TCNN system 400 comprises a heavy-trained convolutional neural network (CNN) module 402, a tailored convolutional neural network (TCNN) module 404, a set of expert classifiers (ECs) module 406, a human labeling system (HLS) module 408, a training data storage module 410, and a tailored CNN (TCNN) training module 412. For some embodiments, the TCNN system 400 implements some or all of the TCNN system 200 described with respect to FIG. 2. For various embodiments, the components and arrangement of components may vary from what is illustrated in FIG. 4.

As used herein, modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

The heavy-trained CNN module 402 may comprise a heavy-trained CNN (e.g., 204), or an interface that enables interactions between the TCNN system 400 and a heavy-trained CNN external to the TCNN system 400. The TCNN module 404 may comprise a TCNN (e.g., 206A, 206B), or an interface that enables interactions between the TCNN system 400 and a TCNN external to the TCNN system 200. A raw image data source 414 may provide a set of raw images (e.g., from a video camera stream) that is processed by the heavy-trained CNN module 402 and that is processed by the TCNN module 404. The ECs module 406 may comprise a set of expert classifiers (e.g., 210), or an interface that enables interactions between the TCNN system 400 and a set of expert classifiers external to the TCNN system 400. The HLS module 408 may comprise a human labeling system (e.g., 212), or an interface that enables interactions between the TCNN system 400 and a human labeling system external to the TCNN system 400. The training data storage module 410 may facilitate storage of ROI pairs, produced by the TCNN system 400, as easy-labeled training data and hard-labeled training data to a training datastore 416. The TCNN training module 412 may facilitate the training of a TCNN using easy-labeled training data, hard-labeled training data, or a combination of both from the training datastore 416.

FIGS. 5-8 are flowcharts illustrating example methods for tailoring a convolutional neural network (CNN), according to some embodiments. It will be understood that example methods described herein may be performed by a device, such as a computing device executing instructions of a TCNN system, in accordance with some embodiments. Additionally, example methods described herein may be implemented in the form of executable instructions stored on a computer-readable medium or in the form of electronic circuitry. For instance, the operations of a method 500 of FIG. 5 may be represented by executable instructions that, when executed by a processor of a computing device, cause the computing device to perform the method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 5:
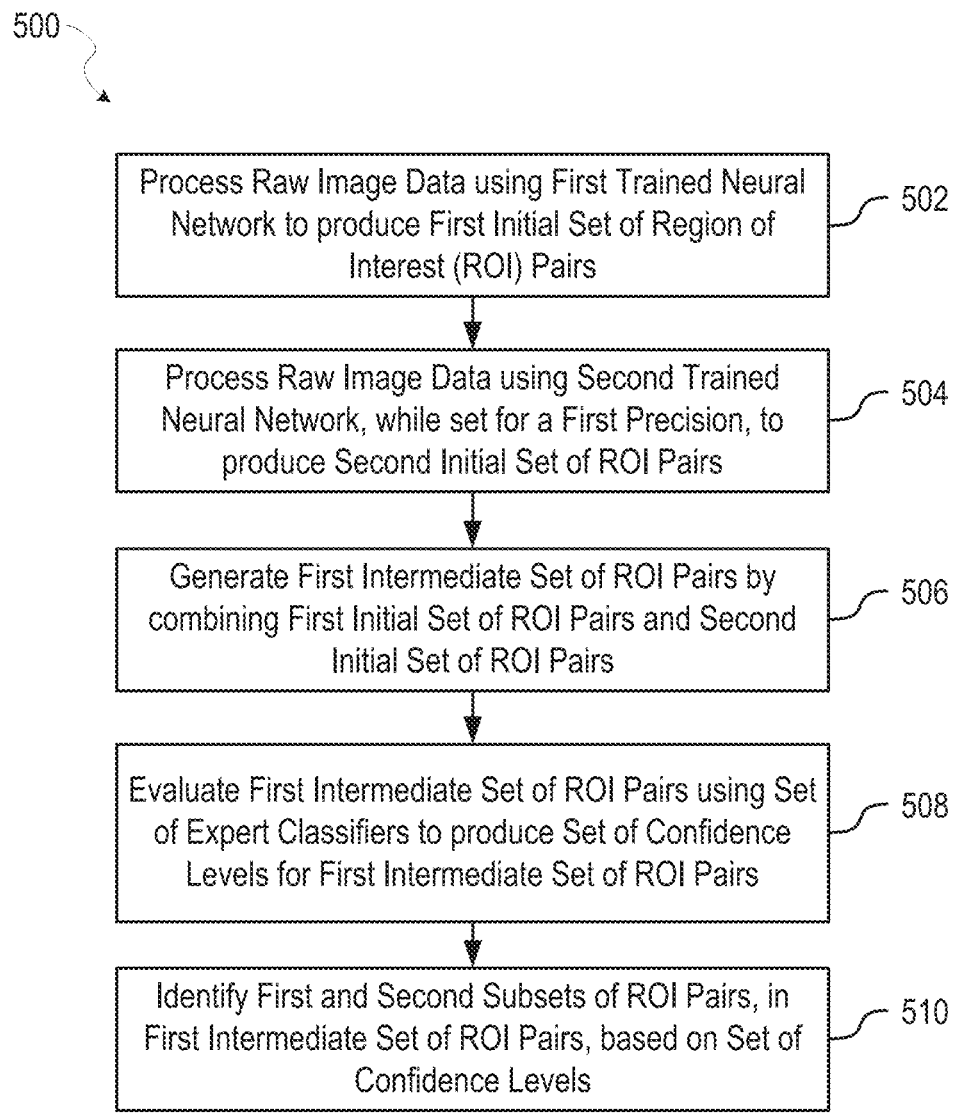
FIGS. 5-8 are flowcharts illustrating example methods for tailoring a convolutional neural network (CNN), according to various embodiments of the present disclosure.

Referring now to FIG. 5, the flowchart illustrates an example method 500 for tailoring a CNN, according to some embodiments. As illustrated, the method 500 begins with operation 502 processing raw image data (or causing the raw image data to be processed) using a first trained neural network to produce a first initial set of region of interest (ROI) pairs. The raw image data may comprise a set of raw images, which may be extracted (e.g., sampled) a video stream. Additionally, the first trained neural network may comprise a heavy-trained CNN (e.g., 204) as described herein.

The method 500 continues with operation 504 processing the raw image data (or causing the raw image data to be processed) using a second trained neural network (e.g., 206A), while the second trained neural network is set for a first precision (e.g., high precision setting), to produce a second initial set of ROI pairs.

The method 500 continues with operation 506 generating a first intermediate set of ROI pairs by combining the first initial set of ROI pairs, from operation 502, and the second initial set of ROI pairs, from operation 504. Combining the first initial set of ROI pairs and the second initial set of ROI pairs may comprise clustering (e.g., matching) the first initial set of ROI pairs and the second initial set of ROI pairs based at least on one of region size, region position, and region label.

The method 500 continues with operation 508 evaluating the first intermediate set of ROI pairs, from operation 506, using a set of expert classifiers (e.g., 210) to produce a set of confidence levels for the first intermediate set of ROI pairs.

The method 500 continues with operation 510 identifying first and second subsets of ROI pairs, in the first intermediate set of ROI pairs from operation 506, based on the set of confidence levels from operation 508. For some embodiments, each ROI pair in the first subset of ROI pairs has a confidence level that does not satisfy a first reference confidence level criterion (e.g., a first confidence level threshold representing a minimum confidence level), and each ROI pair in the second subset of ROI pairs has a confidence level that satisfies the first reference confidence level criterion.

Identifying the first and second subsets of ROI pairs may comprise, for each particular ROI pair in the first intermediate set of ROI pairs, determining whether a particular confidence level, in the set of confidence levels, corresponding to the particular ROI satisfies the first reference confidence level criterion (e.g., meets or exceeds a first predetermined confidence level threshold). In response to the particular confidence level not satisfying the first reference confidence level criterion, the particular ROI is included in the first subset of ROI pairs. In response to the particular confidence level satisfying the first reference confidence level criterion, the particular ROI is included in the second subset of ROI pairs.

Figure 6:
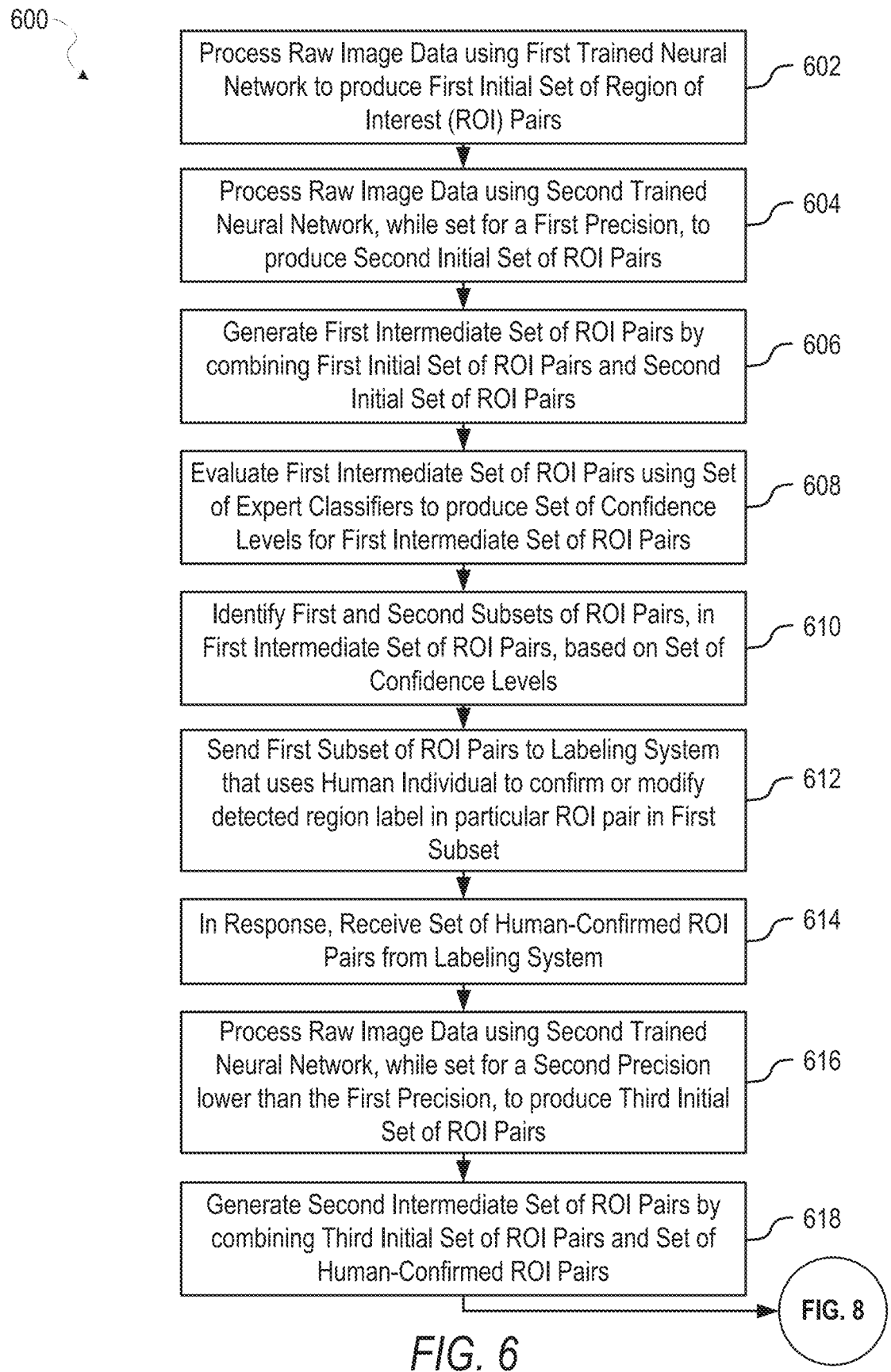

Referring now to FIG. 6, the flowchart illustrates an example method 600 for tailoring a CNN, according to some embodiments. As illustrated, the method 600 begins with operations 602-610, which according to some embodiments are respectively similar to operations 502-510 of the method 500 described above with respect to FIG. 5.

The method 600 continues with operation 612 sending the first subset of ROI pairs, from operation 610, to a labeling system (e.g., 212) that uses a human individual to confirm or modify a particular detected region label, of a particular ROI pair, in the first subset of ROI pairs. For some embodiments, the labeling system comprises a crowd-sourced annotation system.

The method 600 continues with operation 614 receiving a set of human-confirmed ROI pairs from the labeling system in response to operation 612.

The method 600 continues with operation 616 processing the raw image data (or causing the raw image data to be processed) using the second trained neural network (e.g., 206B), while the second trained neural network is set for a second precision (e.g., optimal precision and recall performance) lower than the first precision, to produce a third initial set of ROI pairs.

The method 600 continues with operation 618 generating a second intermediate set of ROI pairs by combining the third initial set of ROI pairs, from operation 616, and the set of human-confirmed ROI pairs, from operation 614. Combining the third initial set of ROI pairs and the set of human-confirmed ROI pairs may comprise clustering (e.g., matching) the third initial set of ROI pairs and the set of human-confirmed ROI pairs based at least on one of region size, region position, and region label. Using a set of confidence levels produced by operation 616 for the third initial set of ROI pairs, operation 618 may assign the set of confidence levels to the second intermediate set of ROI pairs.

Subsequent to operation 618, the method 600 may continue with a method 800 of FIG. 8, which is described in greater detail below with respect to FIG. 8.

Figure 7:
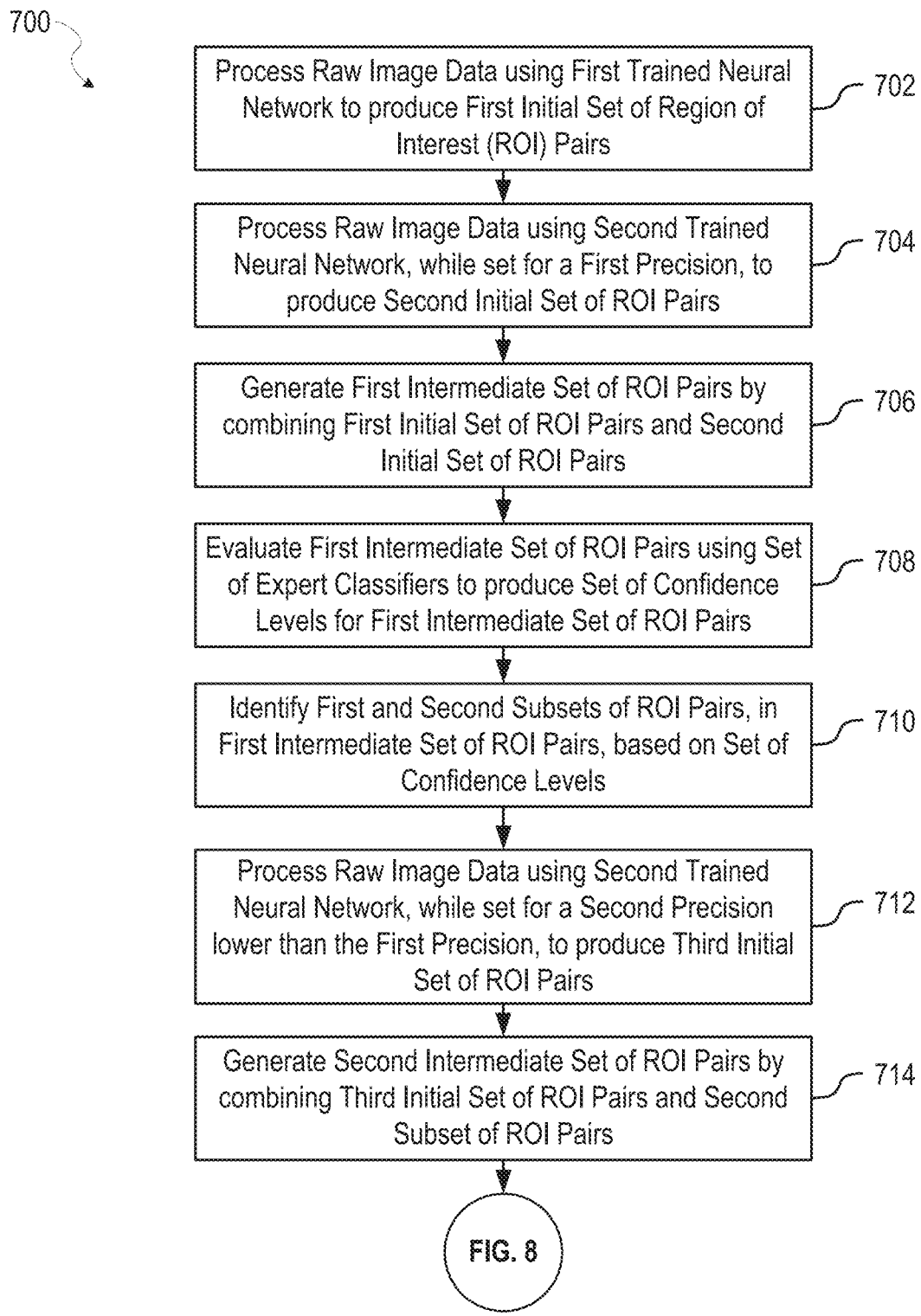

Referring now to FIG. 7, the flowchart illustrates an example method 700 for tailoring a CNN, according to some embodiments. As illustrated, the method 700 begins with operations 702-710, which according to some embodiments are respectively similar to operations 502-510 of the method 500 described above with respect to FIG. 5.

The method 700 continues with operation 712 processing the raw image data using the second trained neural network, while the second trained neural network is set for a second precision (e.g., optimal precision and recall performance) lower than the first precision, to produce a third initial set of ROI pairs.

The method 700 continues with operation 714 generating a second intermediate set of ROI pairs by combining the third initial set of ROI pairs, from operation 712, and the second subset of ROI pairs, from operation 710. Combining the third initial set of ROI pairs and the second subset of ROI pairs may comprise clustering the third initial set of ROI pairs and the second subset of ROI pairs based at least on one of region size, region position, and region label. Using a set of confidence levels produced by operation 712 for the third initial set of ROI pairs, operation 714 may assign the set of confidence levels to the second intermediate set of ROI pairs.

Subsequent to operation 714, the method 700 may continue with the method 800 of FIG. 8, which is described in greater detail below with respect to FIG. 8.

Figure 8:
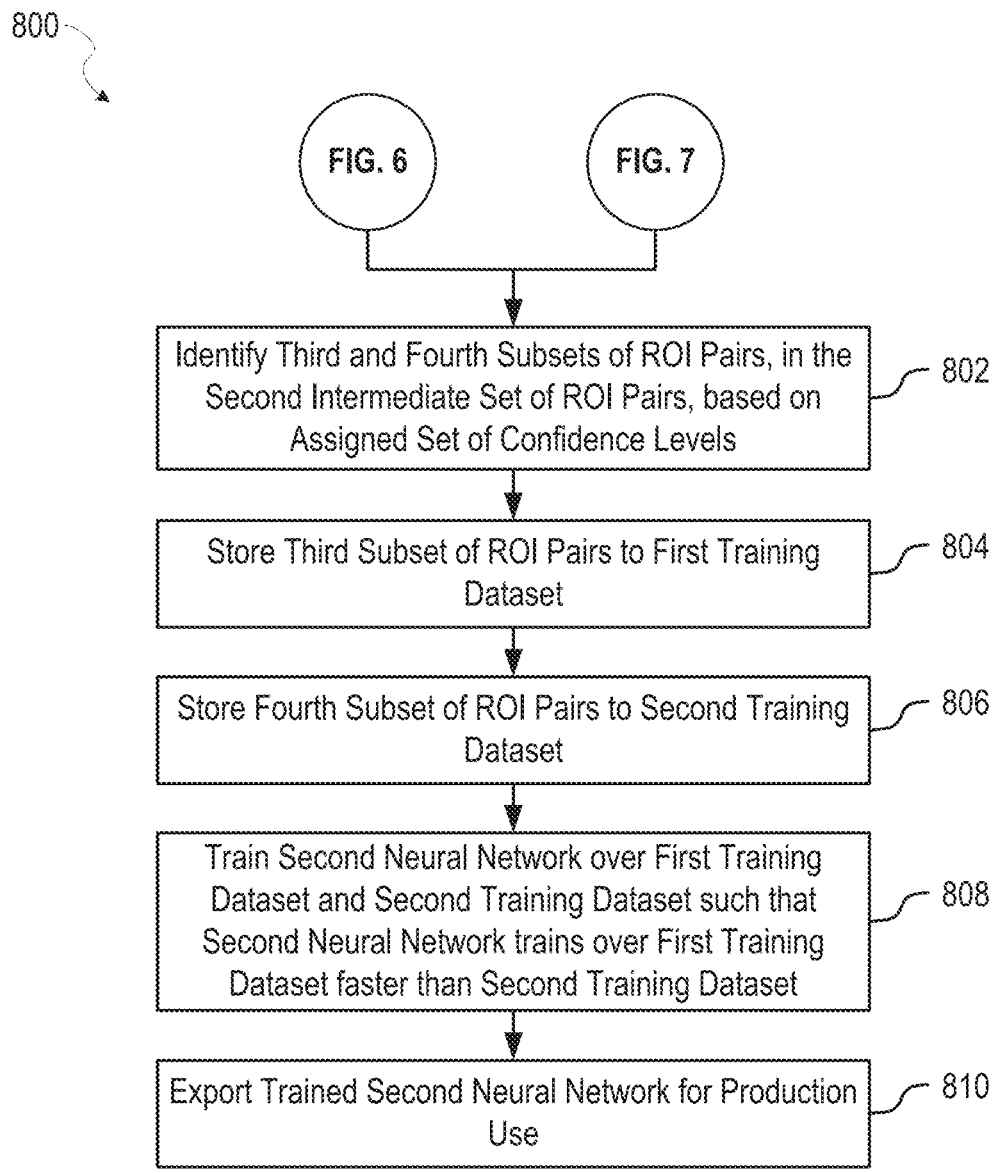

Referring now to FIG. 8, the flowchart illustrates an example method 800 for tailoring a CNN, according to some embodiments. As noted herein, the method 800 can continue from where the method 600 of FIG. 6 or the method 700 of FIG. 7 ends. In particular, the method 800 begins with operation 802 identifying third and fourth subsets of ROI pairs, in the second intermediate set of ROI pairs (from operation 618 or operation 714), based on assigned set of confidence levels. For some embodiments, each ROI pair in the third subset of ROI pairs has a confidence level that does not satisfy a second reference confidence level criterion (e.g., a second confidence level threshold to distinguish between easy-labeled and hard-labeled ROIs), while each ROI pair in the fourth subset of ROI pairs has a confidence level that satisfies the second reference confidence level criterion. The second reference confidence level criterion may assist in determining which regions of interest are easy for the second neural network to label and which regions of interest are hard for the second neural network to label.

Identifying the third and fourth subsets of ROI pairs may comprise, for each particular ROI pair in the second intermediate set of ROI pairs, determining whether a particular confidence level, in the set of confidence levels, corresponding to the particular ROI satisfies the second reference confidence level criterion (e.g., meets or exceeds a second predetermined confidence level threshold). In response to the particular confidence level not satisfying the second reference confidence level criterion, the particular ROI is included in the third subset of ROI pairs. In response to the particular confidence level satisfying the second reference confidence level criterion, the particular ROI is included in the fourth subset of ROI pairs.

The method 800 continues with operation 804 storing (e.g., on the hard-labeled training datastore 218) the third subset of ROI pairs, from operation 802, as a first training dataset. For some embodiments, the first training dataset represents hard-labeled training data as described herein. The method 800 continues with operation 806 storing (e.g., on the easy-labeled training datastore 216) the fourth subset of ROI pairs, from operation 802, as a second training dataset. For some embodiments, the second training dataset represents easy-labeled training data as described herein.

The method 800 continues with operation 808 training the second neural network (or causing the second neural network to train) over the first training dataset and the second training dataset. For some embodiments, the second neural network is caused to train over the first training dataset (e.g., from the hard-labeled training datastore 218) faster than over the second training dataset (e.g., from the easy-labeled training datastore 216).

The method 800 continues with operation 810 exporting the second neural network trained at operation 808 for production use (e.g., deployment to a device for operation in a real-world environment). Operation 810 may export the second neural network to a known ML framework format, such as TENSORFLOW®, Caffe, Torch, and the like.

Figure 9:
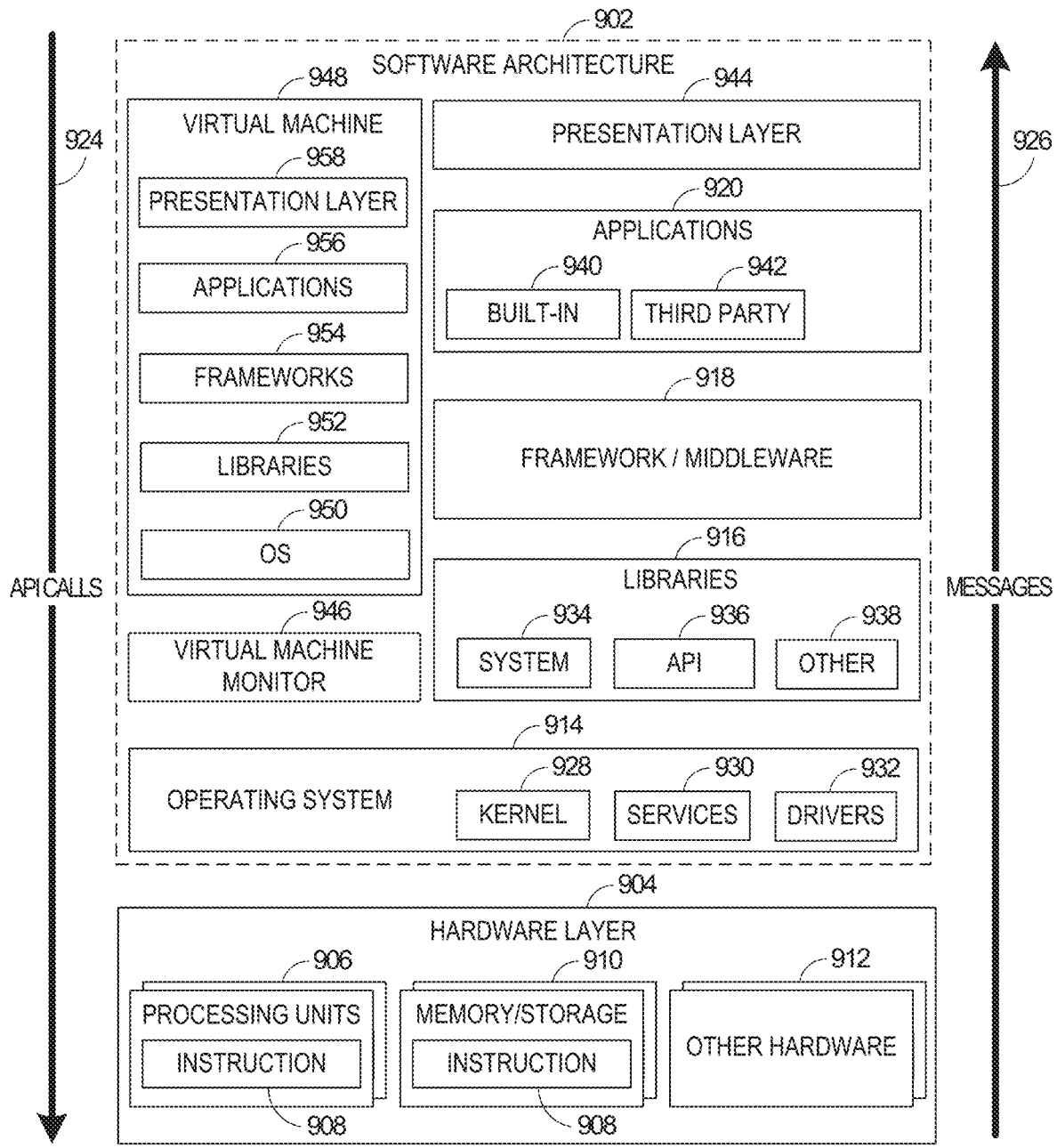
FIG. 9 is a block diagram illustrating a representative software architecture, which may be used in conjunction with various hardware architectures herein described, according to various embodiments of the present disclosure.
Figure 10:
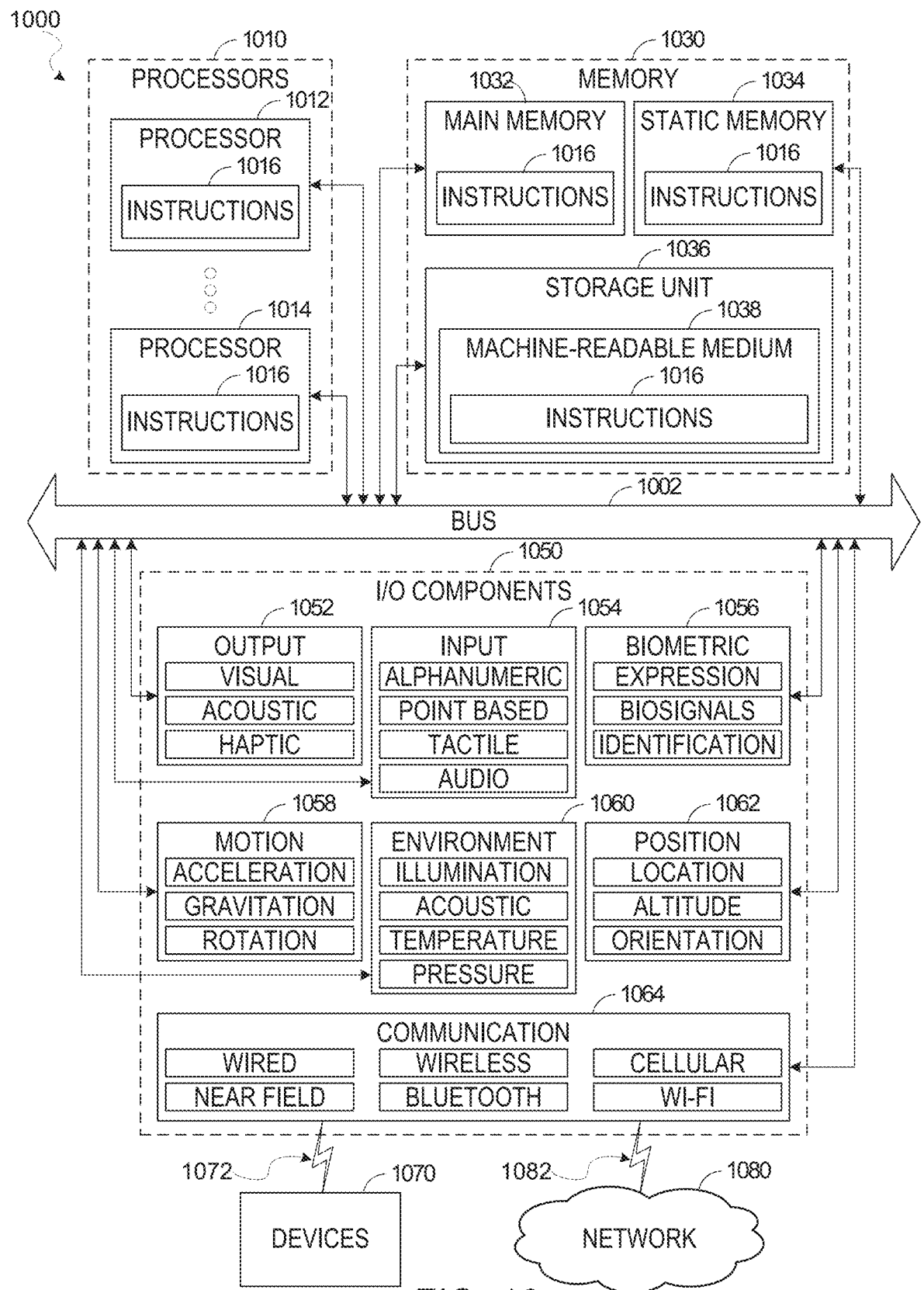
FIG. 10 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 9 or by way of the example machine illustrated by and described with respect to FIG. 10.

FIG. 9 is a block diagram illustrating an example of a software architecture 902 that may be installed on a machine, according to some example embodiments. FIG. 9 is merely a non-limiting example of a software architecture, and it will be appreciated that many other architectures may be implemented to facilitate the functionality described herein. The software architecture 902 may be executing on hardware such as a machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902, including implementation of the methods, modules, and so forth of FIGS. 1-8. The hardware layer 904 also includes memory or storage modules 910, which also have the executable instructions 908. The hardware layer 904 may also comprise other hardware 912, which represents any other hardware of the hardware layer 904, such as the other hardware illustrated as part of the machine 1000.

In the example architecture of FIG. 9, the software architecture 902 may be conceptualized as a stack of layers, where each layer provides particular functionality. For example, the software architecture 902 may include layers such as an operating system 914, libraries 916, frameworks/middleware 918, applications 920, and a presentation layer 944. Operationally, the applications 920 or other components within the layers may invoke API calls 924 through the software stack and receive a response, returned values, and so forth (illustrated as messages 926) in response to the API calls 924. The layers illustrated are representative in nature, and not all software architectures have all layers. For example, some mobile or special-purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than by interfacing directly with the underlying operating system 914 functionality (e.g., kernel 928, services 930, or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a home application, a contacts application, a browser application, a book reader application, a location application, a media application, a messaging application, or a game application.

The third-party applications 942 may include any of the built-in applications 940, as well as a broad assortment of other applications. In a specific example, the third-party applications 942 (e.g., an application developed using the Android™ or iOS™ software development kit (SDK) by an entity other than the vendor of the particular platform) may be mobile software running on a mobile operating system such as iOS™, Android™, Windows' Phone, or other mobile operating systems. In this example, the third-party applications 942 may invoke the API calls 924 provided by the mobile operating system such as the operating system 914 to facilitate functionality described herein.

The applications 920 may utilize built-in operating system functions (e.g., kernel 928, services 930, or drivers 932), libraries (e.g., system libraries 934, API libraries 936, and other libraries 938), or frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with the user.

Some software architectures utilize virtual machines. In the example of FIG. 9, this is illustrated by a virtual machine 948. The virtual machine 948 creates a software environment where applications/modules can execute as if they were executing on a hardware machine (e.g., the machine 1000 of FIG. 10). The virtual machine 948 is hosted by a host operating system (e.g., the operating system 914) and typically, although not always, has a virtual machine monitor 946, which manages the operation of the virtual machine 948 as well as the interface with the host operating system (e.g., the operating system 914). A software architecture executes within the virtual machine 948, such as an operating system 950, libraries 952, frameworks/middleware 954, applications 956, or a presentation layer 958. These layers of software architecture executing within the virtual machine 948 can be the same as corresponding layers previously described or may be different.

FIG. 10 illustrates a diagrammatic representation of a machine 1000 in the form of a computer system within which a set of instructions may be executed for causing the machine 1000 to perform any one or more of the methodologies discussed herein, according to an embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the method 100 of FIG. 1, the method 500 of FIG. 5, the method 600 of FIG. 6, the method 700 of FIG. 7, or the method 800 of FIG. 8. Additionally, or alternatively, the instructions 1016 may implement FIGS. 3A-3F. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036 including machine-readable medium 1038, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1030, 1032, 1034, and/or the memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium." and "computer-storage medium" mean the same thing and may be used interchangeably. The terms refer to a single or multiple storage devices and/or media (e.g., a centralized or distributed database, and/or associated caches and servers) that store executable instructions 1016 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
processing, by one or more hardware processors, raw image data using a first trained neural network to produce a first initial set of region of interest (ROI) pairs, each ROI pair comprising a detected ROI for the raw image data and a detected region label classifying the detected ROI;
processing, by the one or more hardware processors, the raw image data using a second trained neural network, while the second trained neural network is set for a first precision, to produce a second initial set of ROI pairs;
generating, by the one or more hardware processors, a first intermediate set of ROI pairs by combining the first initial set of ROI pairs and the second initial set of ROI pairs;
evaluating, by the one or more hardware processors, the first intermediate set of ROI pairs using a set of expert classifiers to produce a set of confidence levels for the first intermediate set of ROI pairs;
identifying, by the one or more hardware processors, first and second subsets of ROI pairs, in the first intermediate set of ROI pairs, based on the set of confidence levels, each ROI pair in the first subset of ROI pairs having a confidence level that does not satisfy a first reference confidence level criterion, and each ROI pair in the second subset of ROI pairs having a confidence level that satisfies the first reference confidence level criterion;
processing, by the one or more hardware processors, the raw image data using the second trained neural network, while the second trained neural network is set for a second precision lower than the first precision, to produce a third initial set of ROI pairs; and
generating, by the one or more hardware processors, a second intermediate set of ROI pairs based on the third initial set of ROI pairs.

2. The method of claim 1, wherein identifying the first and second subsets of ROI pairs, in the first intermediate set of ROI pairs, based on the set of confidence levels comprises for each particular ROI pair in the first intermediate set of ROI pairs:
determining whether a particular confidence level, in the set of confidence levels, corresponding to the particular ROI satisfies the first reference confidence level criterion; and
including the particular ROI in the first subset of ROI pairs in response to the particular confidence level not satisfying the first reference confidence level criterion; and
including the particular ROI in the second subset of ROI pairs in response to the particular confidence level satisfying the first reference confidence level criterion.

3. The method of claim 1, wherein the combining the first initial set of ROI pairs and the second initial set of ROI pairs comprises clustering the first initial set of ROI pairs and the second initial set of ROI pairs based at least on one of region size, region position, and region label.

4. The method of claim 1, further comprising:
sending, by the one or more hardware processors, the first subset of ROI pairs to a labeling system; and
in response to the sending, receiving, by the one or more hardware processors, a set of human-confirmed ROI pairs from the labeling system.

5. The method of claim 4, wherein the labeling system is a crowd-sourced annotation system.

6. The method of claim 1,
wherein the generating the second intermediate set of ROI pairs based on the third initial set of ROI pairs comprises combining the third initial set of ROI pairs and a set of human-confirmed ROI pairs the set of human-confirmed ROI pairs being provided by a labeling system that uses a human individual to confirm or modify a particular detected region label of a particular ROI pair in the first subset of ROI pairs.

7. The method of claim 6, wherein the combining the third initial set of ROI pairs and the set of human-confirmed ROI pairs comprises clustering the third initial set of ROI pairs and the set of human-confirmed ROI pairs based at least on one of region size, region position, and region label.

8. The method of claim 6, wherein the processing the raw image data using the second trained neural network to produce the third initial set of ROI pairs comprises producing a second set of confidence levels for the third initial set of ROI pairs, the method further comprising:
assigning, by the one or more hardware processors, the second set of confidence levels to the second intermediate set of ROI pairs; and
identifying, by the one or more hardware processors, third and fourth subsets of ROI pairs, in the second intermediate set of ROI pairs, based on the second set of confidence levels, each ROI pair in the third subset of ROI pairs having a confidence level that does not satisfy a second reference confidence level criterion, each ROI pair in the fourth subset of ROI pairs having a confidence level that satisfies the second reference confidence level criterion, and the second reference confidence level criterion assisting in determining which regions of interest are easy for the second trained neural network to label and which regions of interest are hard for the second trained neural network to label.

9. The method of claim 8, wherein identifying the third and fourth subsets of ROI pairs, in the second intermediate set of ROI pairs, based on the second set of confidence levels comprises for each given ROI pair in the second intermediate set of ROI pairs:
determining whether a given confidence level, in the set of confidence levels, corresponding to the given ROI satisfies the second reference confidence level criterion; and
including the given ROI in the third subset of ROI pairs in response to the given confidence level not satisfying the second reference confidence level criterion; and
including the given ROI in the fourth subset of ROI pairs in response to the given confidence level satisfying the second reference confidence level criterion.

10. The method of claim 8, further comprising:
storing, by the one or more hardware processors, the third subset of ROI pairs as a first training dataset;
storing, by the one or more hardware processors, the fourth subset of ROI pairs as a second training dataset; and
training, by the one or more hardware processors, the second trained neural network over the first training dataset and the second training dataset such that the second trained neural network trains over the first training dataset faster than over the second training dataset.

11. The method of claim 1,
wherein the generating the second intermediate set of ROI pairs based on the third initial set of ROI pairs comprises combining the third initial set of ROI pairs and the second subset of ROI pairs.

12. The method of claim 11, wherein the combining the third initial set of ROI pairs and the second subset of ROI pairs comprises clustering the third initial set of ROI pairs and the second subset of ROI pairs based at least on one of region size, region position, and region label.

13. The method of claim 11, wherein the processing the raw image data using the second trained neural network to produce the third initial set of ROI pairs comprises producing a second set of confidence levels for the third initial set of ROI pairs, the method further comprising:
  assigning, by the one or more hardware processors, the second set of confidence levels to the second intermediate set of ROI pairs; and
  identifying, by the one or more hardware processors, third and fourth subsets of ROI pairs, in the second intermediate set of ROI pairs, based on the second set of confidence levels, each ROI pair in the third subset of ROI pairs having a confidence level that does not satisfy a second reference confidence level criterion, each ROI pair in the fourth subset of ROI pairs having a confidence level that satisfies the second reference confidence level criterion, and the second reference confidence level criterion assisting in determining which regions of interest are easy for the second trained neural network to label and which regions of interest are hard for the second trained neural network to label.

14. The method of claim 13, further comprising
  storing, by the one or more hardware processors, the third subset of ROI pairs to first training dataset;
  storing, by the one or more hardware processors, the fourth subset of ROI pairs to second training dataset; and
  causing, by the one or more hardware processors, the second trained neural network to train over the first training dataset and the second training dataset such that the second trained neural network trains over the first training dataset faster than over the second training dataset.

15. The method of claim 1, wherein the raw image data comprises a plurality of raw images from at least one of a video data stream or a database.

16. A system comprising:
  a memory storing instructions; and
  one or more hardware processors communicatively coupled to the memory and configured by the instructions to perform operations comprising:
    processing raw image data using a first trained neural network to produce a first initial set of region of interest (ROI) pairs, each ROI pair comprising a detected ROI for the raw image data and a detected region label classifying the detected ROI;
    processing the raw image data using a second trained neural network, while the second trained neural network is set for a first precision, to produce a second initial set of ROI pairs;
    generating a first intermediate set of ROI pairs by combining the first initial set of ROI pairs and the second initial set of ROI pairs;
    evaluating the first intermediate set of ROI pairs using a set of expert classifiers to produce a set of confidence levels for the first intermediate set of ROI pairs;
    identifying first and second subsets of ROI pairs, in the first intermediate set of ROI pairs, based on the set of confidence levels, each ROI pair in the first subset of ROI pairs having a confidence level that does not satisfy a first reference confidence level criterion, and each ROI pair in the second subset of ROI pairs having a confidence level that satisfies the first reference confidence level criterion;
    processing the raw image data using the second trained neural network, while the second trained neural network is set for a second precision lower than the first precision, to produce a third initial set of ROI pairs; and
    generating a second intermediate set of ROI pairs based on the third initial set of ROI pairs.

17. The system of claim 16, wherein the operations comprise:
  sending the first subset of ROI pairs to a labeling system; and
  in response to the sending, receiving a set of human-confirmed ROI pairs from the labeling system.

18. The system of claim 16, wherein
  the generating the second intermediate set of ROI pairs based on the third initial set of ROI pairs comprises combining the third initial set of ROI pairs and a set of human-confirmed ROI pairs, the set of human-confirmed ROI pairs being provided by a labeling system that uses a human individual to confirm or modify a particular detected region label of a particular ROI pair in the first subset of ROI pairs.

19. The system of claim 16, wherein
  the generating the second intermediate set of ROI pairs based on the third initial set of ROI pairs comprises combining the third initial set of ROI pairs and the second subset of ROI pairs.

20. A non-transitory computer storage medium comprising instructions that, when executed by a hardware processor of a device, cause the device to perform operations comprising:
  processing raw image data using a first trained neural network to produce a first initial set of region of interest (ROI) pairs, each ROI pair comprising a detected ROI for the raw image data and a detected region label classifying the detected ROI;
  processing the raw image data using a second trained neural network, while the second trained neural network is set for a first precision, to produce a second initial set of ROI pairs;
  generating a first intermediate set of ROI pairs by combining the first initial set of ROI pairs and the second initial set of ROI pairs;
  evaluating the first intermediate set of ROI pairs using a set of expert classifiers to produce a set of confidence levels for the first intermediate set of ROI pairs;
  identifying first and second subsets of ROI pairs, in the first intermediate set of ROI pairs, based on the set of confidence levels, each ROI pair in the first subset of ROI pairs having a confidence level that does not satisfy a first reference confidence level criterion, and each ROI pair in the second subset of ROI pairs having a confidence level that satisfies the first reference confidence level criterion;
  processing the raw image data using the second trained neural network, while the second trained neural network is set for a second precision lower than the first precision, to produce a third initial set of ROI pairs; and
  generating a second intermediate set of ROI pairs based on the third initial set of ROI pairs.

* * * * *

UNITED STATES PATENT AND TRADEMARK OFFICE
CERTIFICATE OF CORRECTION

| | |
|---|---|
| PATENT NO. | : 11,093,793 B2 |
| APPLICATION NO. | : 15/689431 |
| DATED | : August 17, 2021 |
| INVENTOR(S) | : Amato et al. |

Page 1 of 1

It is certified that error appears in the above-identified patent and that said Letters Patent is hereby corrected as shown below:

In the Claims

In Column 26, Line 5, in Claim 6, after "pairs", insert --,--

In Column 27, Line 27, in Claim 14, after "comprising", insert --:--

In Column 28, Line 27, in Claim 19, after "wherein", insert --:--

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*